(12) United States Patent
Sgarrella

(10) Patent No.: US 11,309,829 B2
(45) Date of Patent: Apr. 19, 2022

(54) DYNAMICALLY SHIFTING PHOTOVOLTAIC PANEL ARRAY APPARATUS

(71) Applicant: Barry Sgarrella, Novato, CA (US)

(72) Inventor: Barry Sgarrella, Novato, CA (US)

( * ) Notice: Subject to any disclaimer, the term of this patent is extended or adjusted under 35 U.S.C. 154(b) by 0 days.

(21) Appl. No.: 17/204,491

(22) Filed: Mar. 17, 2021

(65) Prior Publication Data

US 2021/0211091 A1 Jul. 8, 2021

Related U.S. Application Data

(63) Continuation-in-part of application No. 16/598,559, filed on Oct. 10, 2019, which is a continuation-in-part of application No. 16/103,755, filed on Aug. 14, 2018, which is a continuation-in-part of application No. 15/949,354, filed on Apr. 10, 2018, now Pat. No. 10,615,738.

(51) Int. Cl.
| | |
|---|---|
| *H02S 20/32* | (2014.01) |
| *F24S 30/00* | (2018.01) |
| *F24S 30/48* | (2018.01) |

(52) U.S. Cl.
CPC ............... *H02S 20/32* (2014.12); *F24S 30/48* (2018.05); *F24S 2030/115* (2018.05)

(58) Field of Classification Search
CPC .... H02S 20/30; H02S 20/32; F24S 2030/115; F24S 2030/131; F24S 2030/136; F24S 30/20; F24S 30/425; F24S 30/428; F24S 30/458; F24S 30/455; F24S 30/48; A01G 9/243

USPC ............................................... 136/246
See application file for complete search history.

(56) References Cited

U.S. PATENT DOCUMENTS

| | | | | |
|---|---|---|---|---|
| 4,102,326 A * | 7/1978 | Sommer | ................. | F24S 30/48 126/575 |
| 4,602,853 A * | 7/1986 | Barr | ....................... | F24S 50/20 359/852 |
| 4,930,493 A * | 6/1990 | Sallis | ...................... | F24S 30/48 126/600 |
| 2007/0039610 A1* | 2/2007 | Head | ....................... | H02S 20/30 126/605 |
| 2010/0139647 A1* | 6/2010 | Silvestre Mata | ..... | F24S 30/455 126/604 |
| 2011/0000515 A1* | 1/2011 | Patwardhan | ............ | H02S 20/32 136/206 |

(Continued)

*Primary Examiner* — Andrew J Golden

(57) ABSTRACT

A series of photovoltaic panels (PV) arranged on a planar, horizontal support platform so as to form a PV array that is pivotally connected to a PV array support structure that can pivotally raise, angle and support the PV array above agricultural fields at heights that allow the passage of large mechanized farm equipment to pass beneath. The PV array support structure pivotally raises its PV array into its operating elevation and positional range with a system of motorized pivot arms operationally positioned between its array columns and the members of the support frame. Once in place, these PV arrays may be horizontally moved by tilting or angling the array columns within a specified operating range (by computer positioning known as dynamic shifting). At the same time, the PV panels may all be optimally tilted for sun sharing and sun shading for both the generation of electricity and to increase the agricultural efficiency of the underlying land.

10 Claims, 15 Drawing Sheets

(56) References Cited

U.S. PATENT DOCUMENTS

2011/0005128 A1\* 1/2011 Chuang .................. F24S 20/67
　　　　　　　　　　　　　　　　　　　47/17
2020/0083838 A1\* 3/2020 Sgarrella ................. H02S 20/32

\* cited by examiner

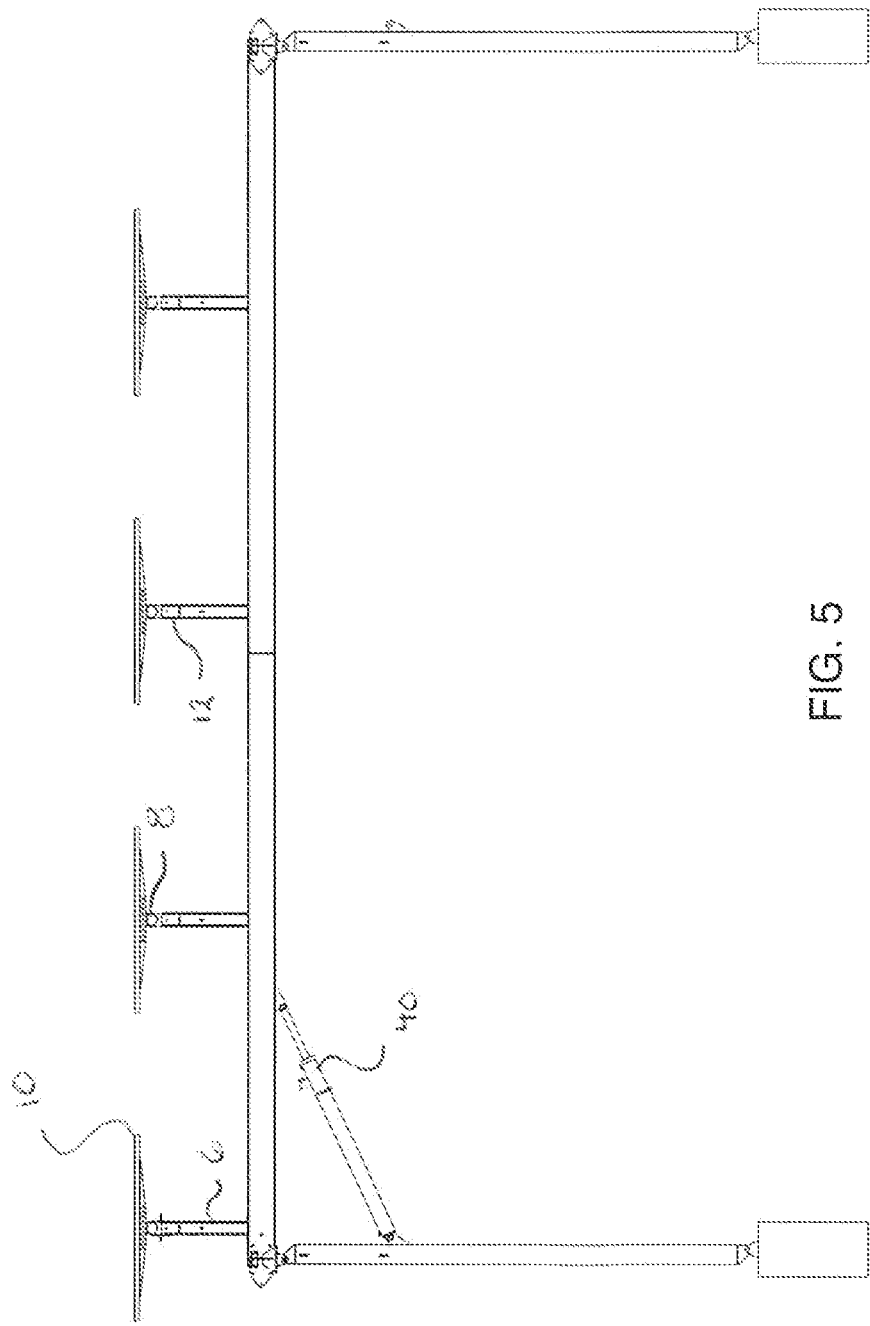

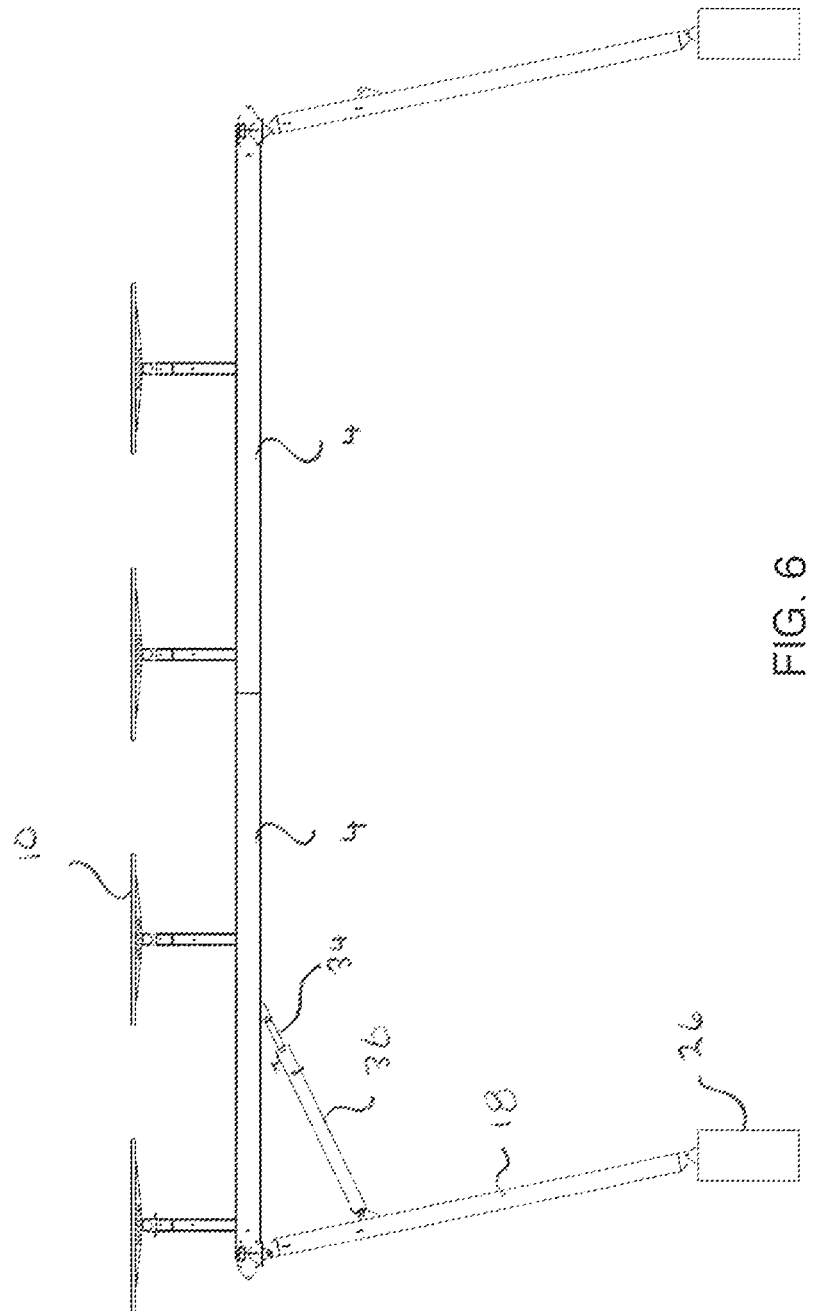

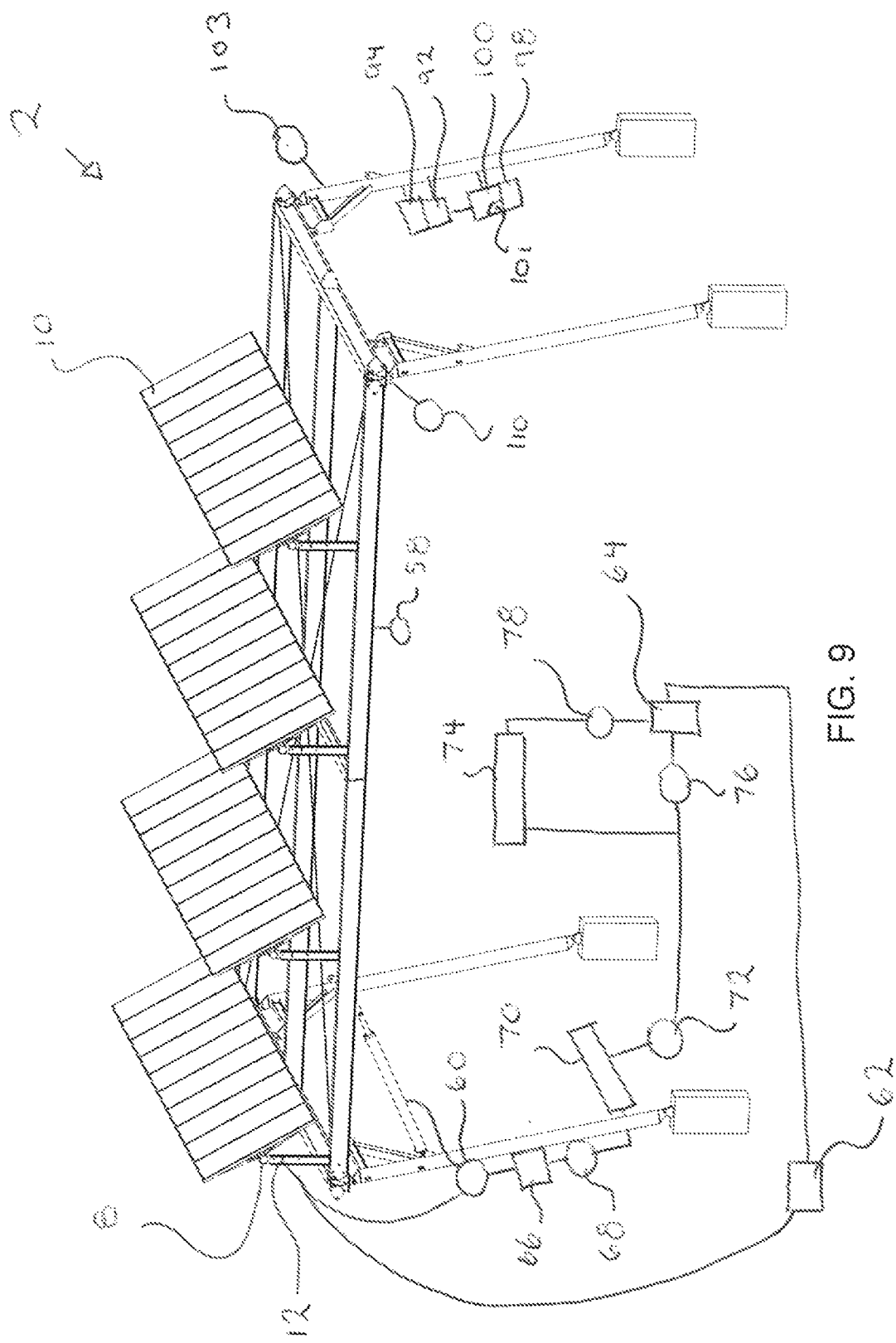

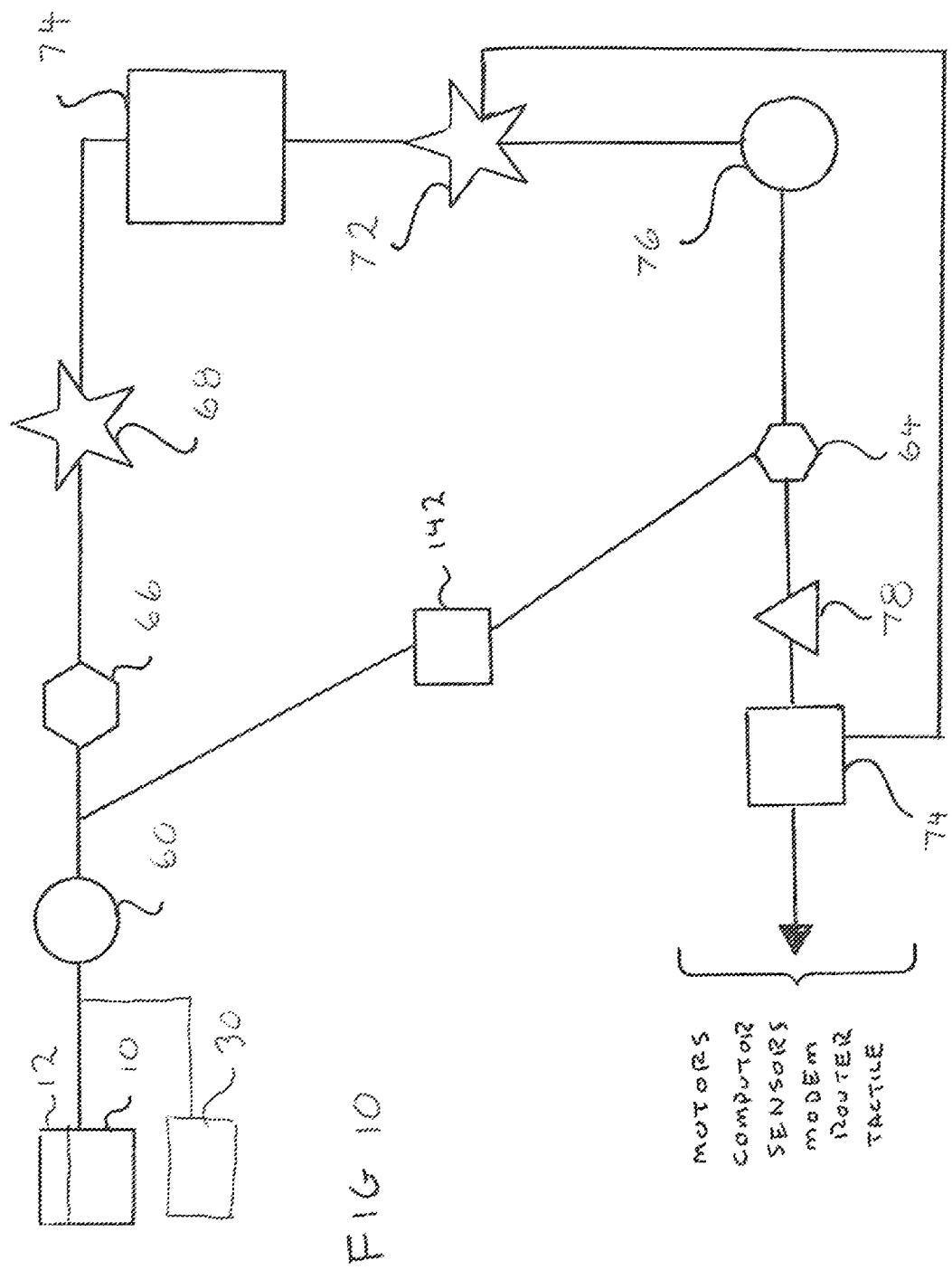

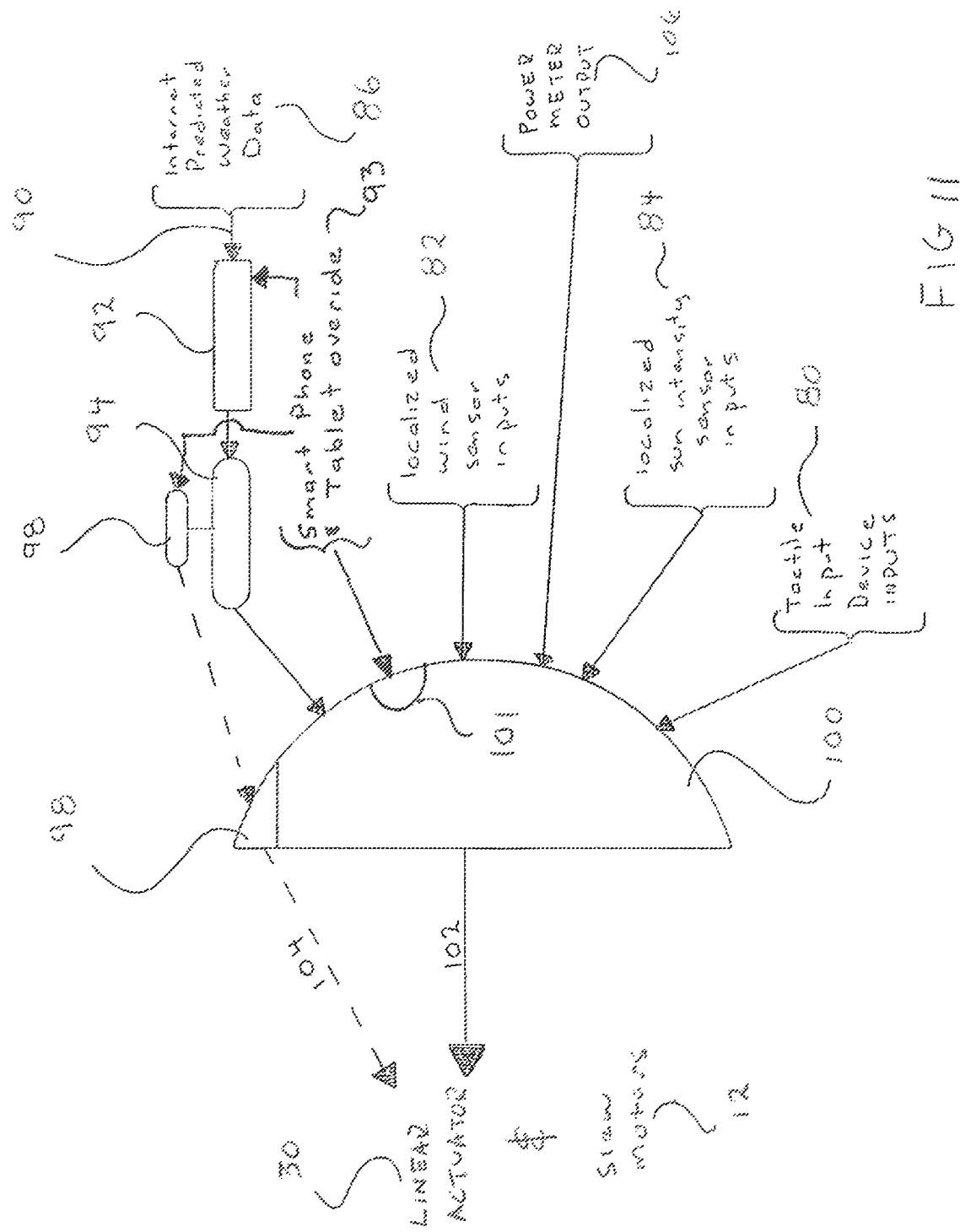

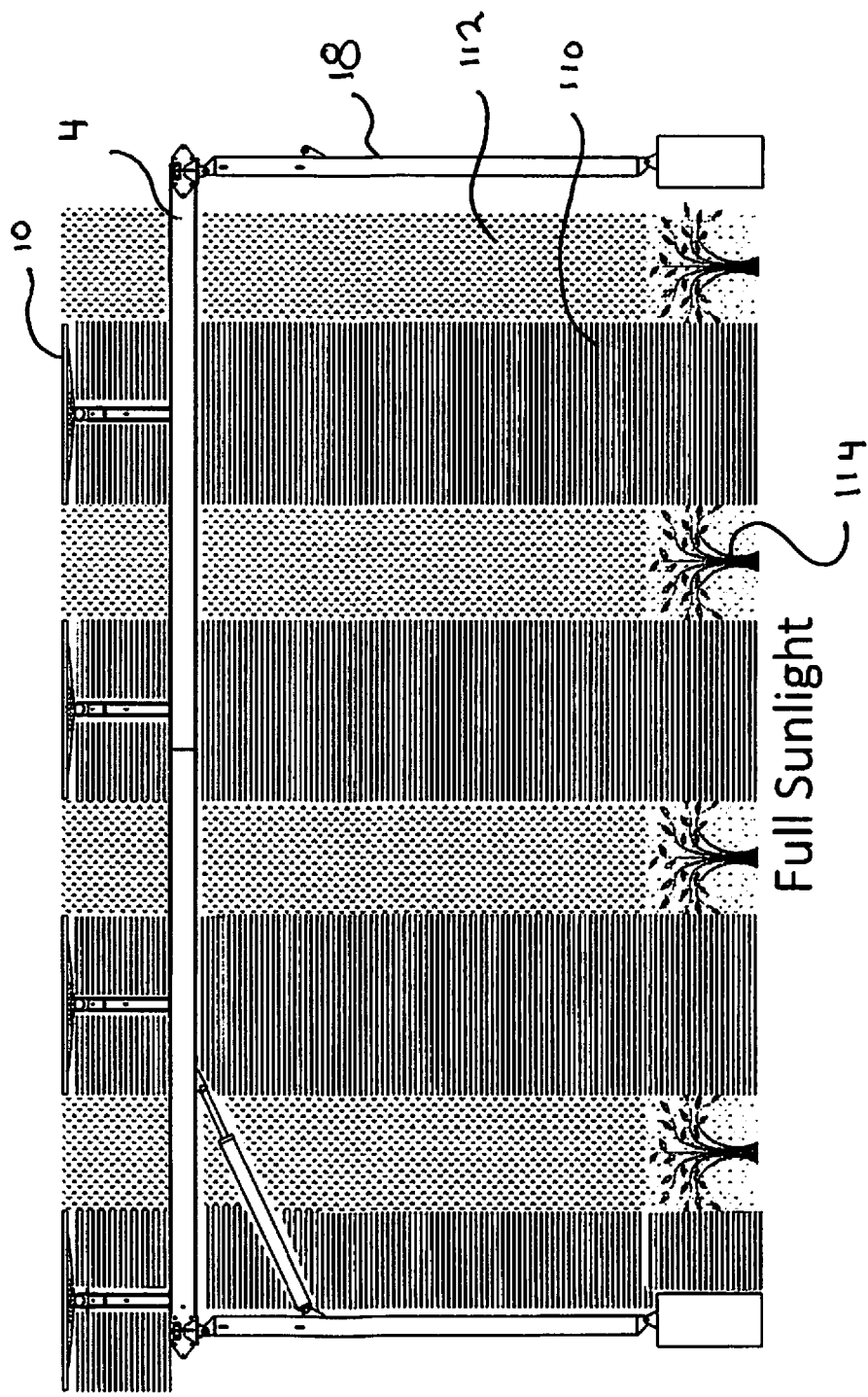

Array Maximum Tilt
Panels Horizontal – Maximum Shading on Row Crops (Grapes, etc.)

Counter Tracking Minimal Shading Field Crops

Counter Tracking Minimal Shadow Moves as Array Tilts

DYNAMICALLY SHIFTING PHOTOVOLTAIC PANEL ARRAY APPARATUS

PRIORITY

This application claims domestic priority to, and incorporates by reference herein the entire disclosure of U.S. Utility patent application Ser. No. 16/598,559, filed Oct. 10, 2019 and entitled "Photovoltaic Panel Array and Method of Use" which is a continuation-in-part patent application of U.S. Utility patent application Ser. No. 16/103,755, filed Aug. 14, 2018 and entitled "Photovoltaic Panel Array and Method of Use" which is a continuation-in-part patent application of U.S. Utility patent application Ser. No. 15/949,354, filed Apr. 10, 2018 and entitled "Photovoltaic Solar Array Support Structure."

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to optimized "double cropping" or "agrivoltaics" which are terms for electric power generation and optimization of agricultural crop growth on the same property. More particularly, to photovoltaic panel arrays optimized for sun sharing and sun shading operation above agricultural lands.

BACKGROUND

Photovoltaic (PV) panels (also termed "solar panels") have come into widespread usage across the US, especially on the heels of government and utility tax incentives and rebates. With cost no longer a factor, the reality of real estate or space often becomes a deciding factor in their use. Since the majority of PV panels range from 14% to 16% efficiency rating, (with a maximum of about 22%) there is a large number of PV panels and a massive amount of planar surface area that is necessary to generate a substantial amount of electricity. In the way of an example, a typical single PV panel occupies 17.6 square feet and has a maximum output between 400 and 485 watts. Taking daylight into consideration the average daily output per PV panel is about 1 kWh. The average home in the US uses about 1,000 kWh of electricity per month. Thus, it takes about 600 sq. feet of PV panel surface to power a house. With their supporting structures, this is about all most homes can accommodate on their roofs.

The future of practical electrical generation with solar panels is in large arrays. These large arrays are not well suited for placement on high cost urban property because of their low power generation to area ratio and their propensity to cast a huge shadow. Besides, rooftops and building walls present a plethora of problems including poor aesthetics, high reflection, poor light transmission below (due to the tight cropping of solar panels), hazardous rain/hail shedding, loss of visibility and the safety of those below.

The ideal rural siting would be on flat terrain, close to urban centers, where wildlife and wildfire damage is minimized, away from environmentally sensitive areas, away from extreme temperatures and near electrical transmission systems. The problem herein is that such locations are generally developed for agricultural use.

Henceforth, a non-agriculturally intrusive large-scale PV panel array rurally sited that can coexist and even enhance the growth of farmed crops beneath coupled with a non-intrusive method of installation would fulfill a long-felt need in both the solar energy industry and in the farming industry. This new invention utilizes and combines known and new technologies in a unique and novel configuration that accomplishes this.

BRIEF SUMMARY

In accordance with various embodiments, a modular PV array capable of dynamically shifting its position in an east-west direction that may be operated at an elevated height above agricultural land, providing optimized sunlight and sun shading/element protection for the efficient growth of crops beneath the array is provided.

In one aspect, a modular, dynamically shiftable PV array supported on its raised horizontal PV platform that has been optimized for both the generation of electricity and the agricultural efficiency of the underlying land.

In another aspect, a modular, dynamically shiftable PV array customizable for the underlying crop, the geological siting and the meteorological conditions so as to generate electricity while optimizing the agricultural production beneath and allowing unhampered, ongoing farming activities in the area directly below the PV array, permitting the use of large, mechanized farm equipment.

In yet another aspect, a modular, dynamically shiftable, PV array capable of optimized sun sharing and sun shading of underlying crops by utilizing a computerized, tracking or "counter tracking" algorithm (based on the sun position sidereal) to adjust the rotational movement of the PV panels as well as the East to West (dynamic shifting) positioning of the PV platform as determined through an algorithm that is customized for that site, the spacing of the PV panels, the opacity (sun blocking) of the specific PV panels, as well as considering the specific crops, growing season, irrigation systems, and underlying field maintenance schedules, so as to enhance the growth of crops by providing adequate sunlight, shade and rain/hail protection for crop growth as well as reducing crop evapotranspiration.

In another aspect, a PV array that may be assembled at ground level, and then pivoted up into its operational position on a set of hinge connections that are connected to the array foundation piers and matched by hinge connections on the solar platform that supports the solar panels.

In yet another aspect, a PV array that allows the passage of ample sunlight to the ground beneath the PV panel array for agricultural purposes and that reduces the amount of irrigation water needed for crop growth while producing photovoltaic energy, is provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIGS. 2-6 are side views of the modular, shifting PV panel array apparatus with its PV panels and PV platform shifted into different operational configurations;

FIG. 9 is a perspective side view of the modular, shifting PV panel apparatus with its operational equipment attached;

FIG. 10 is an illustrative schematic of the PV array's power system;

FIG. 11 is an illustrative schematic of the data acquisition computer's input and output signals;

FIGS. 12-16 are side views of the modular, shifting PV panel apparatus with its PV panels and its PV platform positioned to achieve Sun Sharing and Sun Shading functions.

DETAILED DESCRIPTION OF certain embodiments

Figure 1:
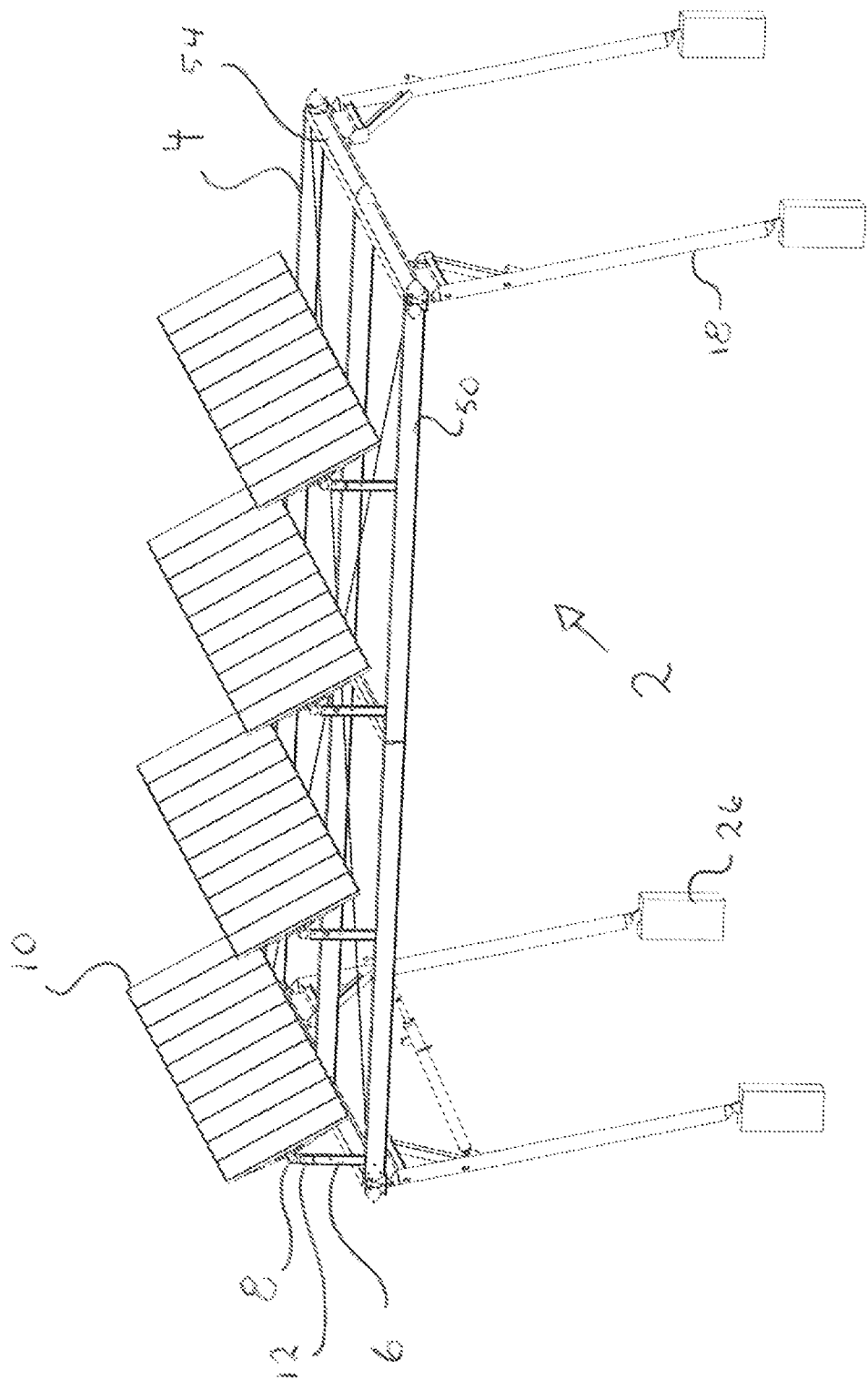
FIG. 1 is a perspective side view of a modular, shifting PV panel array apparatus.
Figure 2:
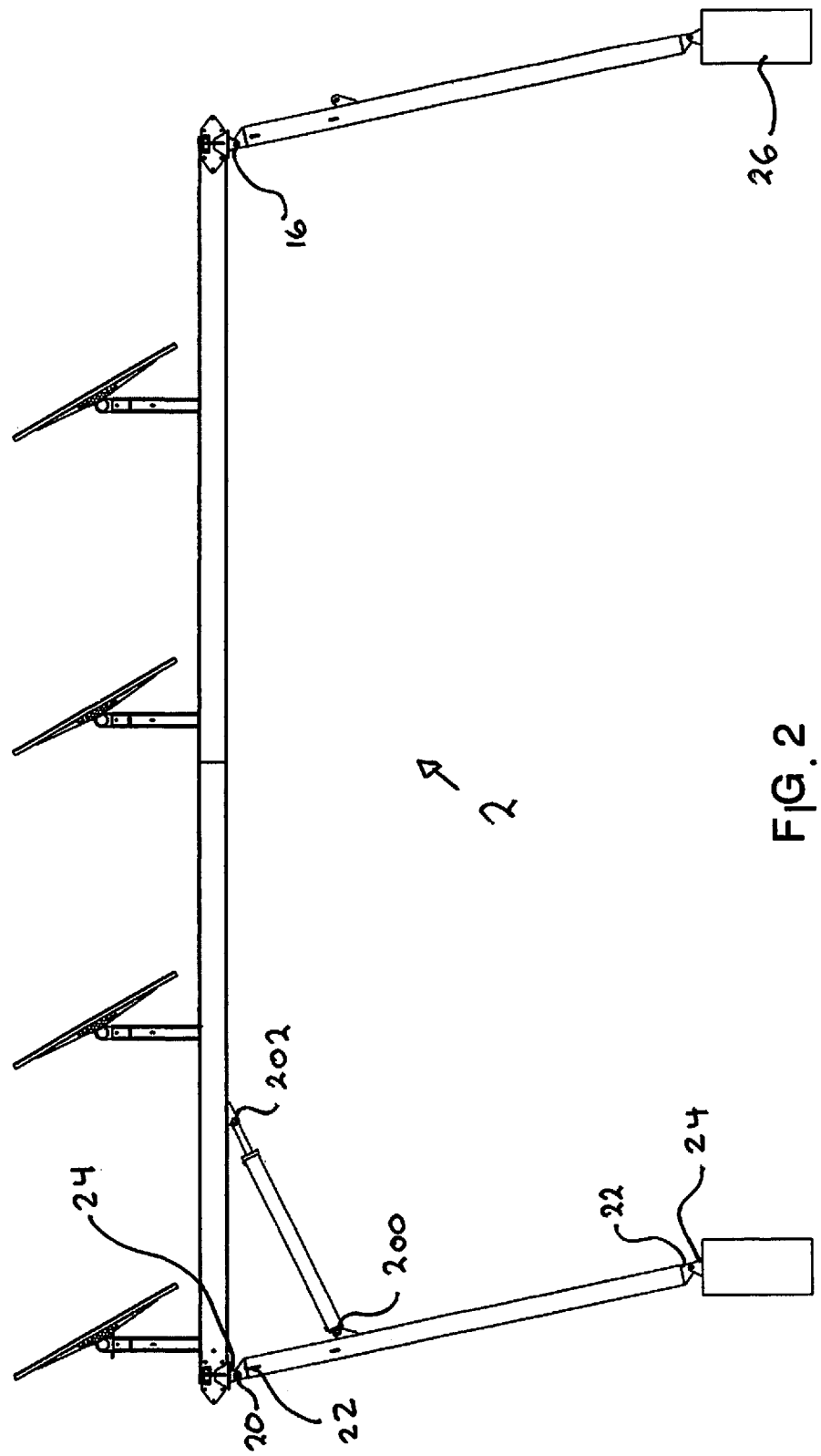
Figure 3:
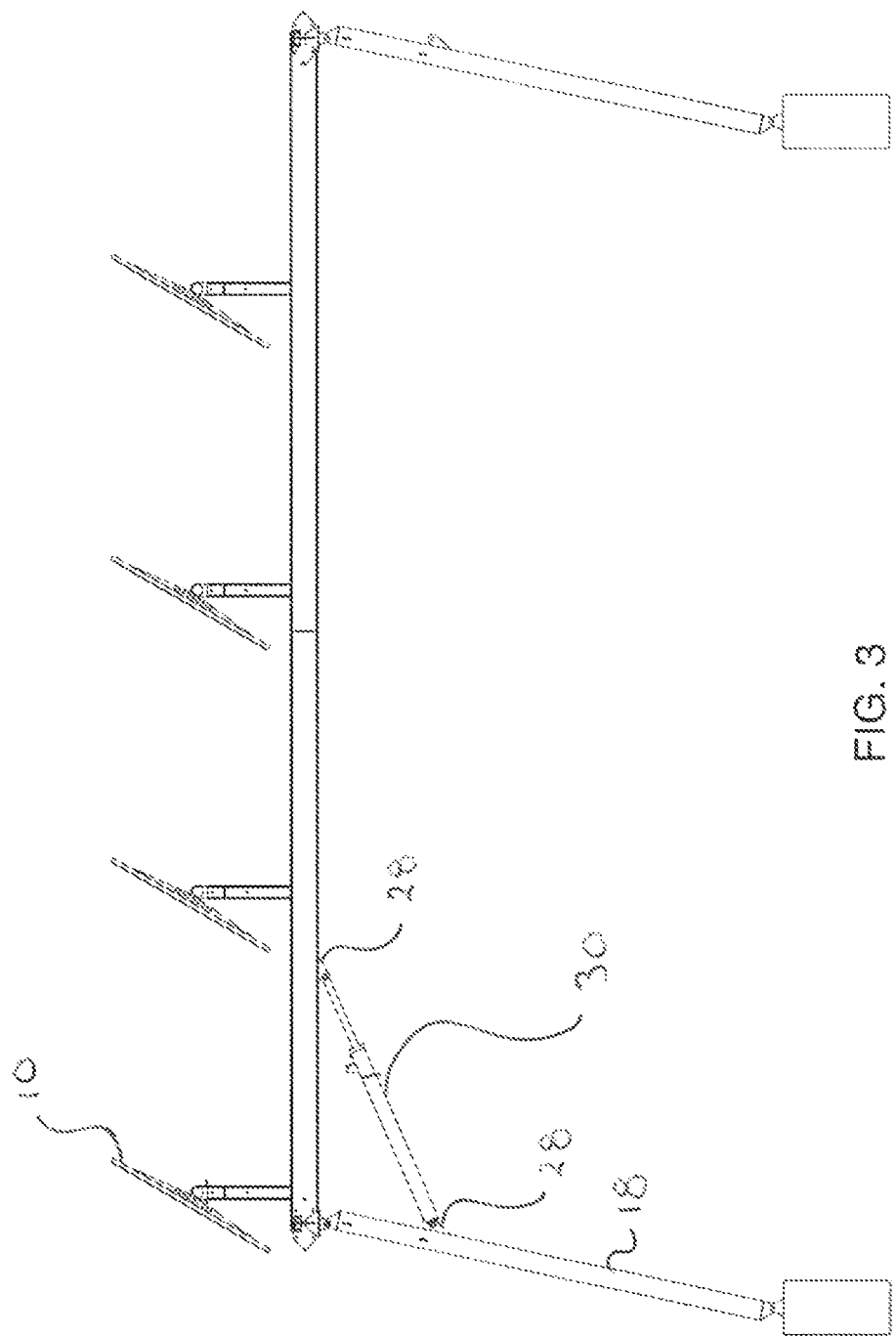
Figure 4:
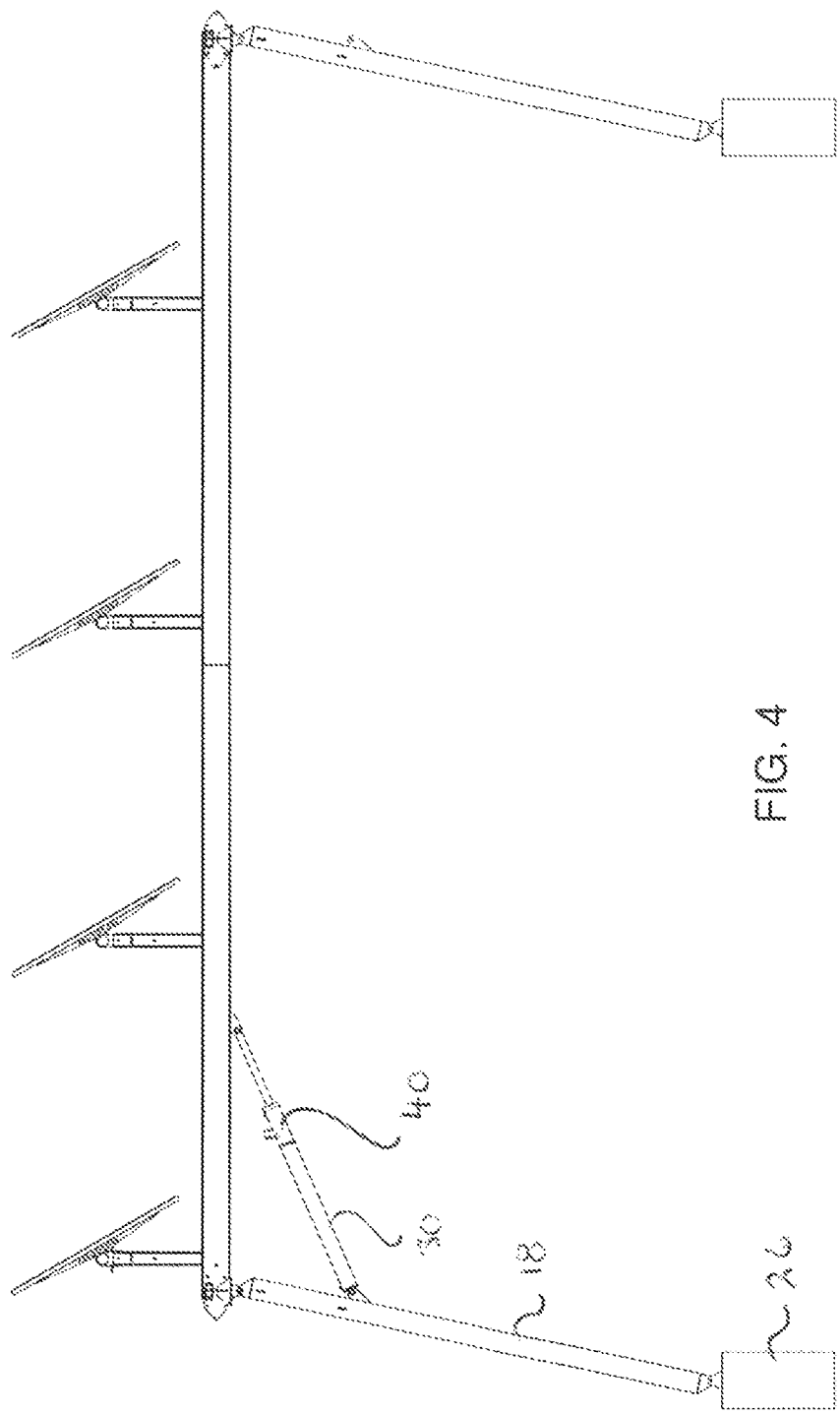
Figure 8:
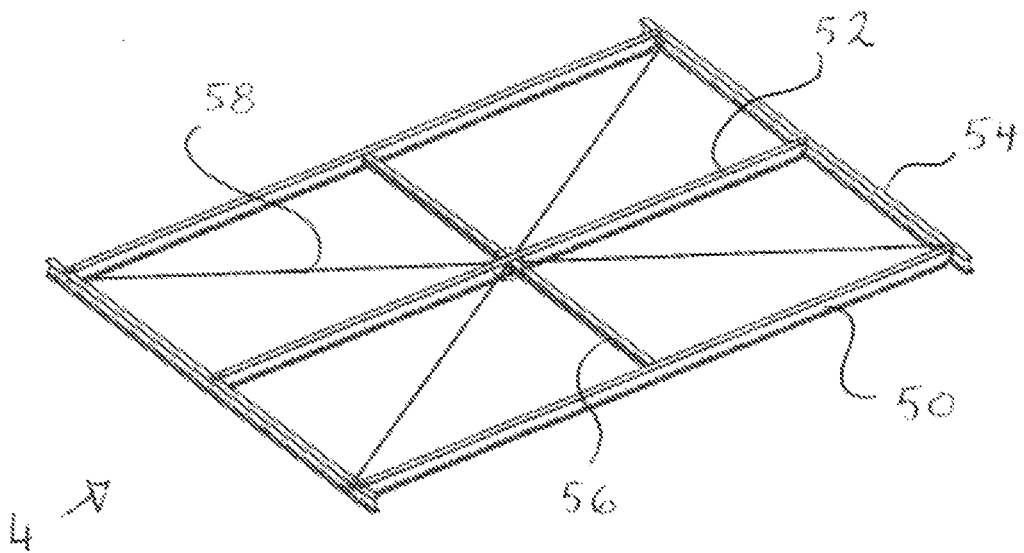
FIG. 8 is a perspective view of the PV platform.
Figure 7:
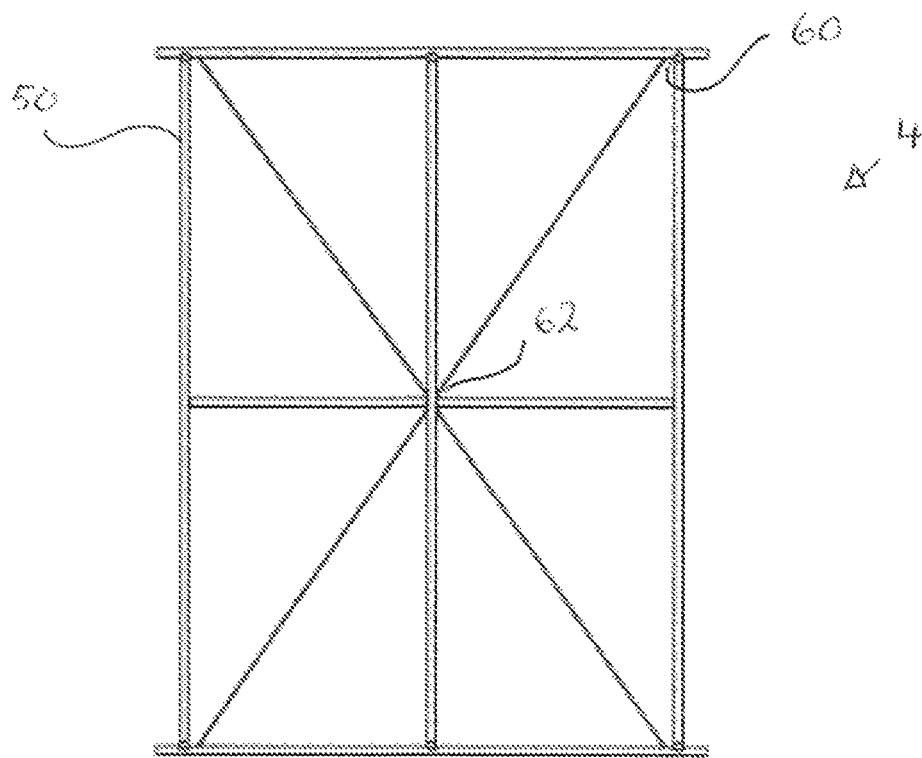
FIG. 7 is a top view of the PV platform.

In the following description, for the purposes of explanation, numerous specific details are set forth in order to provide a thorough understanding of the described embodiments. It will be apparent to one skilled in the art, however, that other embodiments of the present invention may be practiced without some of these specific details.

As used herein, the term "PV panel" refers to a photovoltaic panel, often referred to as a solar panel." A grouping of PV panels (and their associated operational equipment) on a planar, modular frame (a PV platform) constitutes a PV panel array. A PV platform shift and support structure, when pivotally connected to the PV panel array forms the modular dynamically shiftable PV panel array apparatus.

As used herein, the term "sun sharing" refers to a static design or a dynamic movement of the overlying PV panel arrays that allows adequate sunlight to filter through, around or past the PV panels so as to reach the crops beneath the PV panel array.

As used herein, the term "sun shading" refers to a static design or a dynamic movement of the overlying PV panel arrays that allows adequate shading from direct sunlight/rain/hail for the crops beneath the PV panel array so as to reduce the amount of the crop's evapotranspiration and reduce sun/rain/hail damage to the crops.

As used herein, the term "counter tracking" refers to a dynamic, motorized movement of the overlying PV panels, PV panel array, or both, to accomplish the balance of "sun sharing" and "sun shading" for the crops beneath, as dictated by algorithmic instructions performed by a data acquisition computer's specific tracking/counter-tracking program. The counter-tracking program analyzes signals from environmental sensors in conjunction with the sun's location and area/crop specific parameters and directs the data acquisition computer to generate signals to operate the motors to tilt the PV panels and/or dynamically shift the solar platform for optimal efficiency. The algorithm used by the tracking/counter tracking program is customized to optimize crop growth for a specific crop and location.

As used herein, the term "counter tracking program" is a set of instructions optimized for a specific crop and location that are stored in non-volatile memory of a general-purpose data acquisition computer and that directs this computer to generate drive signals for PV panel positional motors and solar platform positional motors based on algorithmic analysis of signals from environmental wind strength and sun intensity sensors, tactile input devices, internet data and sidereal sun tracking position information.

As used herein the term "data acquisition computer" refers to a general-purpose computing device including a real time clock and memory that is capable of performing the algorithmic instructions stored in its non-volatile memory. These instructions take real time input digital data from environmental sensors and other data inputs such as internet weather predictions, and convert them into a format that can be analyzed in conjunction with the sun's movement (position) as determined by a sidereal tracking algorithm. Higher level instructions allow for the analyses of this real time input digital data as it relates to the specific crop's tracking/counter tracking program, allowing for the generation of a drive signals provided to the PV panel positional motors and/or the angle jack assemblies of the PV platform dynamically shifting and support structure. It has a tactile input interface for the input of data and instruction sets.

In general, embodiments can employ as a data acquisition computer a processor, any device or combination of devices, that can operate to execute instructions to perform the system positional functions as described herein. Merely by way of example, and without limitation, any microprocessor can be used as a processor, including without limitation one or more complex instruction set computing (CISC) microprocessors, such as the single core and multi-core processors available from Intel Corporation™ and others, such as Intel's X86 platform, including, e.g., the Pentium™ Core™, and Xeon™ lines of processors. Additionally, and/or alternatively, reduced instruction set computing (RISC) microprocessors, such as the Raspberry Pi™ line of processors, processors employing chip designs by ARM Holdings™, and others can be used in many embodiments. In further embodiments, a processor might be a microcontroller, embedded processor, embedded system, system on a chip (SoC) or the like.

As used herein, the term "processor" can mean a single processor or processor core (of any type) or a plurality of processors or processor cores (again, of any type) operating individually or in concert. The functionality described herein can be allocated among the various processors or processor cores as needed for specific implementations. Thus, it should be noted that, while various examples of processors may be described herein for illustrative purposes, these examples should not be considered limiting.

The present invention relates to a novel design for a PV panel array consisting of a series of PV panels rotationally mounted in rows on a planar, modular frame (a PV platform) on a series of multiple connected platforms that are pivotally connected to a PV platform dynamically shiftable support structure so as to form a modular shiftable PV panel array apparatus. In the preferred embodiment the PV platform is 45 feet by 35 feet in size. The linear axes of the PV panels reside along the east-west axis. This PV panel array resides on its support structure on agricultural lands elevated high enough to allow the unhampered passage and use of sizeable machinery below, preferably 10 to 16 feet above the ground. The large-scale PV panel array operates to allow enough sunlight and rain to pass through, around and by the PV panels for efficient agricultural activities directly beneath. This is accomplished using a data acquisition computer that utilizes a tracking/counter-tracking program to achieve a balance of optimized crop growth and electrical power generation by changing the PV panel angles and the east to west translation of the PV platform. The tracking/counter tracking program analyzes a plethora of input data and changing environmental and crop-based input parameters that are algorithmically calculated to accomplish these movements. This PV panel array allows solar power to be produced on farmland while sustaining and often improving the quality of the crops produced. This is accomplished using a unique method of controlling the tracking algorithms that drive the positioning of single-axis tracking PV panels and also the horizontal East to West position of the PV arrays to share sunlight with the crops that are being grown beneath the PV arrays (Sun Sharing) or protect these crops (Sun Shading) at optimal times of day and in their growth cycle. Studies have shown that a typical array of this configuration will produce up to 500 KW per/acre.

Looking at FIGS. 1-8 the skeletal structure of the PV panel array apparatus 2 can best be seen and explained. A modular PV platform 4 is made of two parallel exterior running spars 50 and one interior running spar 52 connected at their ends to both perpendicular boundary beams 54, and connected at their approximate midpoints to two stiffening spars 56. There are four optional diagonal, tensionable braces 58 (preferably of threaded steel rod) running between the four diagonal interior corners 60 and the four central corners 62 where the interior running spar 52 and the stiffening spars 56 are connected. (The support structure for the array 4 is detailed in U.S. patent application Ser. No. 15/949,354, incorporated in its entirety herein and entitled "Photovoltaic Solar Array Support Structure.")

Here in FIGS. 1- 5, the array 2 consists of two joined planar, modular PV platforms 4 that have rows of substantially similar vertical posts 6 mechanically affixed thereon the stiffening spars 56 and boundary beams 54. Preferably the PV platform 4 will be formed as a 3×3 or 4×4 matrix of identical, rectangular PV platforms referred to as segments. Mounted vertically on each row, across the top ends of the posts 6 and parallel with the North-South axis, is a rotatably connected torque tube 8 that spans the width of the PV platforms 4. These torques tubes 8 have their linear axes in the N-S direction. Onto each torque tube 8 there is a row of operationally connected PV panels 10, each having their linear axis oriented parallel to the east-west axis. There are drive motors 12 mounted on the posts 6, connected with mechanical linkages to the torque tubes 8. There is one drive motor 12 per row of connected PV panels 10. Optionally, these drive motors may be mounted directly near the center of the torque tube 8.

The PV panels 10 are each approximately seven ft long (length of X) and with the PV panels 10 rotated completely horizontal (rotated to solar noon) the ends of the PV panels in the adjacent rows are approximately three and a half feet apart (length of ½ X). Each torque tube 8 section has 8 to 10 PV panels rigidly affixed to it. There are 4 torque tubes 8 per PV platform 4 for a total of 32 to 40 PV panels 10 per modular PV platform 4.

The torque tubes 8 rotate the row of connected PV panels from 60 degrees east facing to 60 degrees west facing with solar noon horizontal in the center. (120 radial degrees overall rotation.) The torque tube 8 rotates 60 degrees clockwise and 60 degrees counterclockwise to tilt the PV panel 10 for the most efficient electrical power generation as its electric drive motor 12 is directed by the single axis tracker to optimize the collection of energy from the sun as it is moving across the sky from morning to night.

These drive motors 12 are operationally connected to a data acquisition computer 100 to rotate the torque tubes 8 and adjust the angle of the PV panels 10 based on human tactile input signals or signals received from environmental sensors and data from the internet/other external sources. In the preferred embodiment, the adjustment of the angle of the PV panels 10 as well as the East to West translation of the PV platform 4 to produce the Sun Sharing or Sun Shading features of the PV panel array apparatus 2. This will be fully automated by the data acquisition computer 100 with the option for a manual override performable from a smart cell phone. The data acquisition computer 100 receives all of the sunlight intensity data, weather forecasts, wind direction and speed, time and date from online sources and local sensors that it utilizes in conjunction with its Sun Sharing and Sun Shading algorithm to create the drive signals to the linear actuators 30 and drive motors 12.

The PV platform 4 is supported by the PV platform shift and support structure that has at least four pivotable connections 20, pivot assemblies 16, linear actuators 30, linear actuator mounts 28 and foundation piers 26. Connected between the array columns 18 and the PV platform 4 are pivot assemblies 16. These pivot assemblies 16 have a first coupling half and second coupling half, and can have many different designs as is well known in the art to allow the hinging or pivot motion between the PV platform 4 and the array columns 18. In the preferred embodiment, this pivot assembly 16 is structurally simple. Its first coupling half 24 is a vertical plate that extends perpendicularly from the horizontal plane of the PV platform 4. This plate has an orifice formed therethrough for pivotal connection to the top end of the array columns 18 using pivot axle assemblies 20. The top end of the pivotable bases mounted on the array columns 18 have the second coupling half 22 which is the upper pivot bracket. This upper pivot bracket may be a single or two parallel plate design of bracket, also with an orifice formed therethrough so as to matingly, pivotally engage with the vertical plate using a pivot axle 20 that passes through both of the coupling halves 24 and 22.

The array columns 18 in the preferred embodiment are tubular linear members arranged at the corners of each module (or rectangular series of modules), with a first coupling half 24 or second coupling half 22 of the pivot assembly 16 at their distal and proximal ends. (The first coupling half and second coupling half of the pivot assemblies may be reversed thus can be connected to either an end of a piling or the PV platform 4.) The array columns 18 are generally made of a round or rectangular cross-sectional steel pipe/tubing. Round, square or octagonal concrete or fiberglass array columns may also be used.

The manner the top ends of the array columns 18 pivotally connect to the PV platform 4 is substantially similar to the way the bottom ends of the array columns 18 connect to the pier foundations 26, although the couplings and pivot assembly 16 may be inverted. Thus, the array columns 18 may have two first coupling halves 24 or two second coupling halves 22 or one of each thereon.

Between the distal and proximal ends of the array columns 18 vertically extends the first of two linear actuator mounts 28. A substantially similar second linear actuator mount 28 vertically extends from the PV platform 4. These linear actuator mounts 28 are simple mechanical devices which are plates and brackets with aligning orifices formed therethrough which accommodate a pivot axle (pin or circular rod) to allow rotational motion between them. A linear actuator 30 (a double acting cylinder 30) has its first end 200 (preferably the non-extending housing end) directly pivotally connected to the one linear actuator mount 28 on the tiltable piling 18. (See FIG. 2) (Generally, between the two parallel plates extending from the base plate of the linear actuator mounts 28.) Its second end 202 (preferably the extendable end) is directly, pivotally connected to the second linear actuator mount 28 on the PV platform 4 in the same fashion. (See FIG. 2) Between these two linear actuator mounts 28 is a double acting cylinder 30. As can be seen in FIGS. 1 - 6, this double acting cylinder resides at an acute angle with respect to a vertical axis and can never reside horizontally, as it must always have an included, acute angle between the platform and the array column that exceeds 0 degrees. (These double acting cylinders generally have connecting fixtures with an orifice there through at both of their ends.) In the preferred embodiment these cylinders 30 are electric screw jacks, however they may also be actuated by pneumatic, or hydraulic means. The cylinders 30 needed to translate the PV platform need only be located on the array columns 18 along one side of the PV platform, typically at the south end of that module. When the platform is translated, the complete PV array is translated as the complete PV array resides atop of the PV platform. (See FIG. 1) The manner of pivotal connection of the linear actuator ends to the linear actuator mounts 28 parallels that of the connections between the array columns 18 and the foundation piers 26.

Although disclosed with a series of four array columns 18 in the corners of the PV platform 4, the piling arrangement may be expanded as necessary for support and additional movement power. In the way of an example, with a wider North to South PV platform, the weight of the array 2 may increase to the point where a pair of double acting cylinders 30 may be too weak to shift the PV platform 4. With the PV panels 10 spaced approximately three and a half feet apart and being approximately seven feet in length, the dynamic shift of the PV platform 4 need only be minor, enough for an approximate three and a half feet translation to either side (East or West) of its normal perpendicular position. This allows the horizontal translation to compensate for all of the shading caused by a seven foot long PV panel 10. When the fields lie fallow there is no need for any horizontal translation of the PV platform 4 and the normal tracking that angles the PV panels 10 for maximum solar collection is the only motion the system 2 experiences.

The anchors 26 are imbeds partially buried into the ground beneath the array columns 18. They are generally drilled reinforced concrete piers, massive concrete footings or monolithic cubes, that rise out of the ground enough to allow access and connection to the couplings of the pivot assembly 16, one of which is imbedded thereon its top face. Alternately, the base plate of the first coupling half may be bolted into the piers.

This planar, rectangular PV platform 4 generally is arranged in a 3×3 or 4×4 matrix of identical, rectangular segments, and when pivotally raised above an agricultural field resides at an approximate height of 15 feet. This hinge design allows the PV platform 4 to be translated horizontally in an east-west direction to move the shadow on the ground below as the sun traverses the sky. This is known as "Dynamic Shifting" and gives increased flexibility in controlling the shadows on crops as compared to just rotating (normal tracking) or counter-rotating (counter-tracking) the PV panels 10.

The PV platform 4 can be of any size as it is constructed of modules (of other PV platforms 4) connected anywhere (especially at the corners) with a universal cruciform connector that can be used on any corner or any side of any Segment. Segments are rectangular in preferred embodiment approximately 44' 10.5"×34'4". The overall dimensions of the PV platform 4 is 132'10.5"×105' and will allow for 156.6 KW power generation. The array columns 18 when erected to a vertical position only shift a few degrees east-west and have mechanical stop mechanisms (locks) 40 (installed after erection) to prevent shiftable movement beyond this amount. The overall weight of the PV platform 4 will exceed 10,000 lbs. The system's linear actuators 30 have been calculated to handle both the live and dead loads.

In operation, the cylinders 30 extend to rectilinearly translate the PV platform 4 horizontally to the West, and the cylinders 30 retract to rectilinearly translate the PV platform 4 horizontally to the East. When this occurs, the angle included between the spars of the PV platform 4 and the array columns 18 may be acute, right or obtuse. This horizontal translation can achieve two important functions. It can ensure that an adequate amount of sunlight reaches the crops below (Sun Sharing) or it can ensure the crops below are protected from excess sunlight, rain and hail (Sun Shading). Similarly, the rotation of the torque tube 8 to tilt the PV panels between a horizontal and inclined angle 10 also accomplishes the same two functions of Sun Sharing and Sun Shading by operating the cylinders 30 as well as the drive motors 12, either alone or in unison, following an algorithmically calculated timed sequence, based on preset and local environmental data analyzed by the data acquisition computer 100 with respect for the specific Sun Sharing and Sun Shading algorithm used for that crop and that location. (It is to be noted that the row crops 114 of FIGS. 11 and 12 are spaced the same distance between rows as the spacing between PV panel rows and the crop rows lie parallel to the PV panel rows that form the PV panel array.

The platform itself moves horizontally to the East and to the West a combined distance approximately equal to the length of the PV cells/panels (X). It moves ½ X to the East and ½ X to the West. This allows alternate day movement above the agricultural field from the furthest extent to the East to the furthest extent to the West. This moves the shadowed area of the seven foot PV cell seven feet to the East or seven feet to the West. This allows the ground underneath to be shaded by the PV cells 10 or not shaded by the PV cells 10 as the array columns 18 shift slightly to the east and west with the extension or retraction of the linear actuators 30 between the PV platform 4 and the array columns 18. The PV cells 10 pivot and the PV platform 4 translates horizontally as the array columns 18 tilt. Both the array columns 18 and the torque tubes 8 are moved by commands from the data acquisition computer 100.

In prior art systems, the counter tracking feature that tilts the PV panels 10 for solar efficiency, was the principle means for ensuring the crops below were shaded as well as the means for fine tuning the solar collection efficiency. With the horizontal translation capabilities of the linear actuators 30, this horizontal movement of the PV platform 4 becomes the principal means of Sun Sharing and Sun Shading while the drive motors 12 still retain the means for controlling the ultimate efficiency of the system.

Looking at FIGS. 12-16 the rotating PV panel feature and the dynamically shifting PV platform 4 feature of the array 2 can be seen. For perspective, in the preferred embodiment the rows of PV panels 10 are spaced on 11.25' centers. Each PV panel 10 is 6.78' long. The minimum space between PV panel rows occurs when the PV panels 10 are horizontal (at solar noon). This leaves a space of 3.43' between the edges of PV panels 10 between rows for direct sunlight to pass thru onto the crops below. As the PV panels 10 track the sun, this space is larger at all other times of the solar day. When the array columns 18 are vertical, by moving the entire array 2 horizontally a minimum of 3.39' to the east and then later in the day 6.78' back to the west, the shaded crop areas below the PV panel rows can be fully irradiated. Different schemes of Sun Sharing and Sun Shading are possible including one wherein the array 2 is laterally moved once each day, so on opposite days the columns are 3.39' east of vertical and the following day they are 3.39'. This is a total travel distance of 6.78' (which is the length of the PV panels 10).

For safety considerations, and because of the buffeting load the PV platform experiences in wind gusts, the angle limiting stop mechanisms 40 built into the double acting cylinders 30 to ensure that the extendable ram 34 of the cylinder 30 does not retract or extend beyond that necessary to keep the PV platform 4 within preset ranges of movement. These angle limiting stop mechanisms 40 in the preferred embodiment are motor driven pins that lock into aligned orifices in the cylinder housing 36 and ram 34 There is a host of other mechanical stop devices that can also be utilized such as ratcheting gears, rack and pinion locks, locking levers, etc.

Having the pivot assemblies 16 also affixed between the proximal end of the array columns 18 and the anchors 26, allows the entire the modular shifting PV panel array apparatus 2 to be assembled on the ground and then pivoted up to its operable "parked" 90 degree position by a tow vehicle moving horizontally on the ground. Larger farm equipment such as tractors may also perform this task. This eliminates the need for the use of an expensive crane to erect the apparatus 2.

Looking at FIGS. 9-11 the operational equipment that coordinates the rotational movement of the torque tubes 8 and the horizontal translational movement of the PV platform 4 can best be seen and explained. FIG. 9 shows the modular, shifting PV panel array apparatus 2 with its operational components mounted on its structure. On the array apparatus 2 is mounted solar power D/C power output meter 60 which is directly connected to the electrical output of the array apparatus 2. (This power meter is operably connected to the data acquisition computer 100.) The charge controller 62 is connected between the electrical output of the PV array and the battery bank 64. Also connected to the output of the PV panel array is the inverter 66 to which is connected first transformer 68, the output of which feeds into the main A/C power grid 70. Power drawn from the main power grid 70 is fed to second transformer 72 and then directly to the PV array's local operational power grid 74 or indirectly to the PV array's power grid 70 through the AC/DC charging unit 76 and the DC battery bank 64 and then the rectifier 78.

The data acquisition computer 100 generates signals to initiate the operation of the torque tubes 8 through their drive motors 12 (with their integrated motor controllers) to change the inclination of all of the PV panels 10 in its row simultaneously. Individual PV panel rows may be controlled by the data acquisition computer to perform individually in a tracking technique known at back-tracking at certain times of the sideral cycle. (In alternate embodiments there may be individual rotational motors used for vertical rotation of the PV panels 10, also operated through their motor controllers by the data acquisition computer 100.) It also generates the signals to drive the linear actuators 30 to shift the PV platform 4.

As illustrated in FIG. 11, the data acquisition computer 82 receives signals from a tactile input device 80 (such as a keyboard or a visual monitor/keyboard station), the localized wind strength (and or direction) sensor inputs 82, the localized sun intensity (PAR) sensor inputs 84 and internet weather data signals 86 via the world wide web 90 through a modem 92 and a router 94. These signals are preferably transmitted via hard wiring, although in alternate embodiments the router 94 may have a wireless transceiver (Wi-Fi or Bluetooth) that communicates with a wireless transceiver 98 in the data acquisition computer 100. The wind and sun intensity sensors may also transmit their signals wirelessly. After algorithmic analysis of the input data is performed, the data acquisition computer 100 outputs a signal (hard wired 102 or wireless 104) to the drive motors 12 or linear actuators 30, (optionally to any vertical rotational motor controllers) to tilt the PV panels 10 and translate the PV platform 4. The Data acquisition computer 100 also has a cellular network connected data modem 101 that allows direct communication with a cell phone. (This modem 101 is configured for a specific cell provider's network.) This allows the data acquisition computer 100 to accept an override signal from a smart cell phone or a tablet 93 to manually operate the system 2 and directly operate the drive motors 12 and linear actuators 30 to position the PV panels 10 and the PV platform 4 to override the signals the data acquisition computer 100 generates. Lastly, there is an output signal from the PV panel DC power output meter 106 operationally connected to the data acquisition computer 100.

In the event of a connectivity loss to cell phone through the cellular network connected data modem 101, there is redundancy in the communication between the smart cell phone/tablet and the data acquisition computer. This override signal from a smart cell phone may also reach the data acquisition computer in two alternate routes. First, through the cell phone via the cell service provider's cellular network onto an SMS gateway and onto the internet and to the standard internet modem 92 using the internet protocol. Second, using the wireless transceiver 98 to receive Wi-Fi signal as a WAP from the smart phone. However, this transmission of serial data to the data acquisition computer 100 is only received when the smart cell phone is turned on and within range of the wireless transceiver 98. Both of these technologies are well known in the industry and will not be disclosed further herein.

As can be seen in FIG. 9, the PV array's local operational power grid 74 supplies the power to operate all of the PV array's components including the data acquisition computer 100, router 94, modem 92, wireless transceivers, drive motors 12, linear actuators 30, all sensors, and the tactile input device 80. It receives power in several different ways to ensure operational stability. It draws power directly from the main A/C power grid 70 or from the battery bank 64 which is supplied from both the charge controller 62 (getting DC power from the PV panels) and the second transformer 72 (getting power from the main power grid 72). With this type of redundancy, the PV array's operational power should always be available.

Strategically mounted on the bottom of the segment platform of the support structure 2, between the rows of panels, below the axis of rotation of the panels and extending downward a distance from the mounting point, residing between the rows of PV panels is at least one sun intensity sensor 58 measuring photosynthetically active radiation (PAR) in the specific spectral range of 400 to 700 nanometers. This is the range sunlight of the electromagnetic spectrum which photosynthetic organisms such as crops are able to use in photosynthesis. These sensors determine the average PAR that is getting through to the crops growing beneath the PV arrays. Alternatively, these PAR sensors may be adjusted to monitor and act upon others spectral ranges as may be determined by current research of different segments of the light spectrum supporting more effective and efficient growth in various plant species.

At the corners of the support structure are wind sensors 110 measuring actual wind speed and/or direction. Both the wind and sun intensity sensors are operably connected to the data acquisition computer 100 and the PV array's local operational power grid 74. The data acquisition computer 100, router 94 and modem 92 are operationally connected for data transfer as well as operationally connected to the PV array's local operational power grid 74. The data acquisition computer periodically polls the internet, extracting predicted weather forecast data (especially wind speed). With these three data input signals (as well as time and any tactile input command) the data acquisition computer algorithmically determines the proper angular position for the PV panels 10 to be in and the translational position for the PV platform 4 to be at. It then sends the appropriate signals to the drive motors 12 to adjust the angular position of the panels and to the linear actuators 30 to translate the PV platform 4 horizontally.

Generally, the PV panels 10 face East at 60 degree inclination from horizontal to meet the morning sun and slowly ecline as the torque tubes 12 rotate to the fully horizontal solar noon position (sun at highest point in sky) then rotates to face West at a 60 degree inclination from horizontal to finish the day generating power from the setting sun. The linear actuators' horizontal shifting of the PV platform 4 allows alternated days of sun shading for crops in high sun/heat regions. It also may be programmed to slowly move the PV platform 4 between its East and West extents so Sun Shading and Sun Sharing occurs simultaneously. However, when the fields are lying fallow for a few months of the year, normal sun tracking will occur but no shifting of the array columns 18 for horizontal PV platform movement will occur.

It is to be noted that the environmental conditions such as localized high wind speed as well as certain human tactile input commands from the tactile input device, and a smart cell phone in computer application's algorithm, have priority in the adjustment of the tracking command profile for the movement of the panels. This generally is for safety concerns and to protect or service the equipment. For example, the panels will be tilted approximately 60 degrees for washing. The full up to horizontal position can take over an hour of continuous movement to accomplish. (Incidentally, the energy generation difference between the 45 degree tilted (up) position and the horizontal (parked) position is only approximately 20%.)

In future embodiments, there may be more environmental sensors incorporated such as temperature sensors, rain sensors, humidity sensors, wind direction, ground moisture and the like operationally connected to the data acquisition computer 100 to provide input data used by the tracking/counter tracking program. These will be important as the algorithms and applications are developed further to consider more of the specific crop growth factors. Although, at this time the type of crop species, local sun intensity, location, time of year, timing of crop species growing cycle are all factors considered and evaluated in the algorithmic determination of panel position, future algorithms will become more sophisticated and look at many more crop growth related parameters as the crop pallet expands.

Optionally, there may also be a solar position tracking device 103 mounted on the structure as is well known in the field, that can be used to provide a signal to the data acquisition computer 100 related to the sun's position. Presently without such a system, the sun's position used in the tracking/counter tracking program will be determined from a relational database of sun positions vs times and dates stored in the data acquisitions memory or accessible from the internet. These environmental inputs are used in the algorithm as they provide information used to minimize the angle of incidence between the incoming sunlight and the PV panel.

The advantages of the modular, shifting PV panel array apparatus 2 can best be seen in FIGS. 12-16. The counter tracking feature tilts the PV panels for three different purposes: for maximum sunlight exposure to the PV panels and minimum sunlight exposure as well as for protection of the underlying crop field from the elements specifically, rain, hail, sleet and snow (Sun Shading); and for maximum sunlight exposure to the underlying crop field and minimum sunlight exposure to the PV panels (Sun Sharing). The translational movement of the PV platform moves the shadow that is created on the ground by the PV panels and allows the expansion of Sun Sharing and Sun Shading as required. This east-west horizontal translational movement (shifting) can be done independently of the Counter-Tracking tilt of the PV panels or simultaneously with it.

FIG. 12 shows an arrangement of minimal shading 110 and maximum sunlight 112 to the row crops 114 when the PV panels 10 are fully horizontal. Here it is solar noon and the PV panels 10 are angled horizontally to catch the maximum amount of sunlight from the directly overhead sun. The array columns 18 are perpendicular to the PV platform 4 and the ground.

Figure 13:
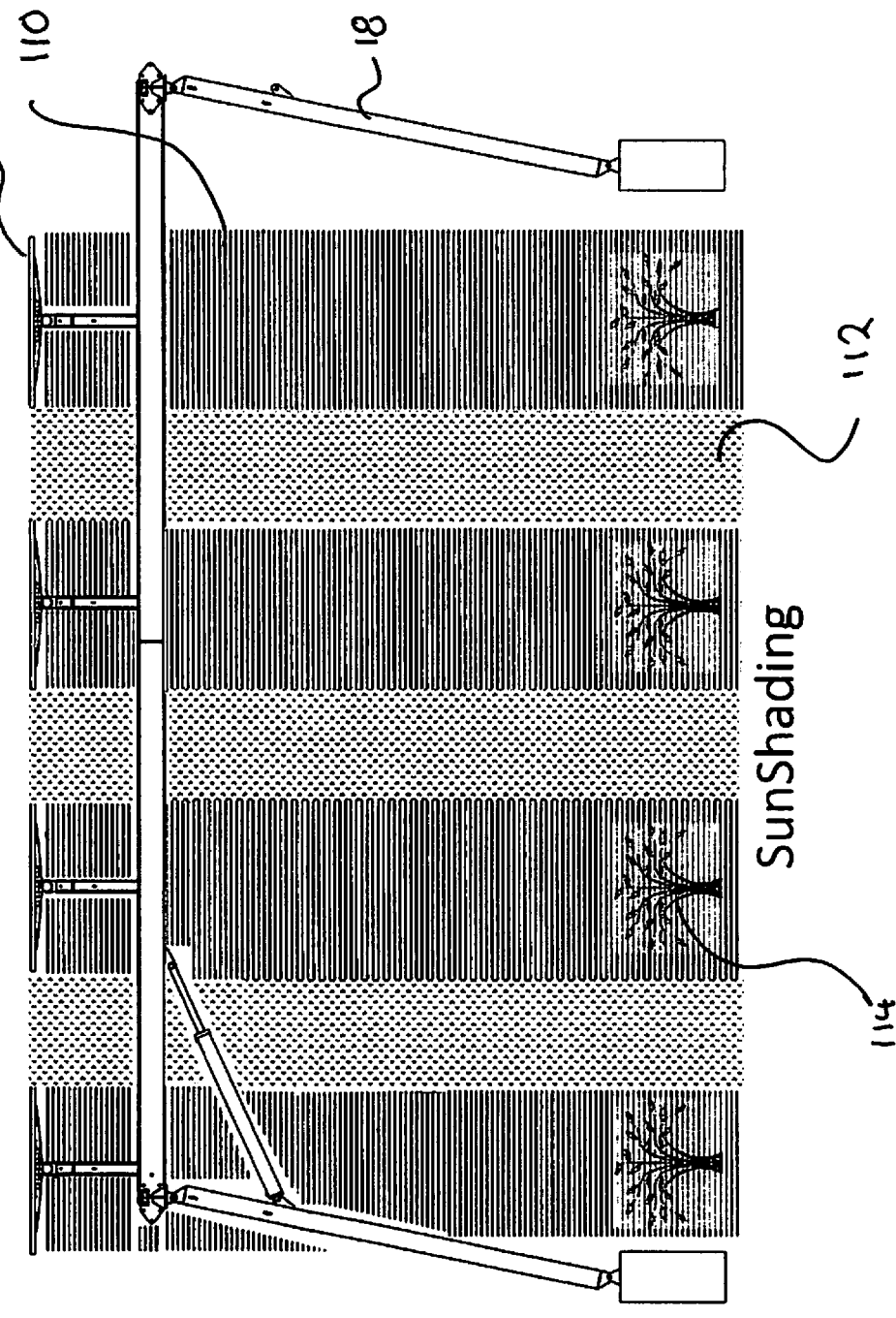

FIG. 13 shows an arrangement of maximum shading 110 and minimum sunlight 112 to the row crops 114 when the PV panels 10 are fully horizontal. Here it is solar noon and the PV panels 10 are angled horizontally to catch the maximum amount of sunlight from the directly overhead sun. The difference between this situation and the one described in FIG. 12 is that the array columns 18 are tilted to translate the PV platform 4 and the PV panels 10 the half the approximate length of the PV panel 10 (approximately 3.5 feet). As can be seen the PV panels can still receive 100 percent of the available solar energy and now protect the underlying row crops from excess sunlight.

Figure 14:
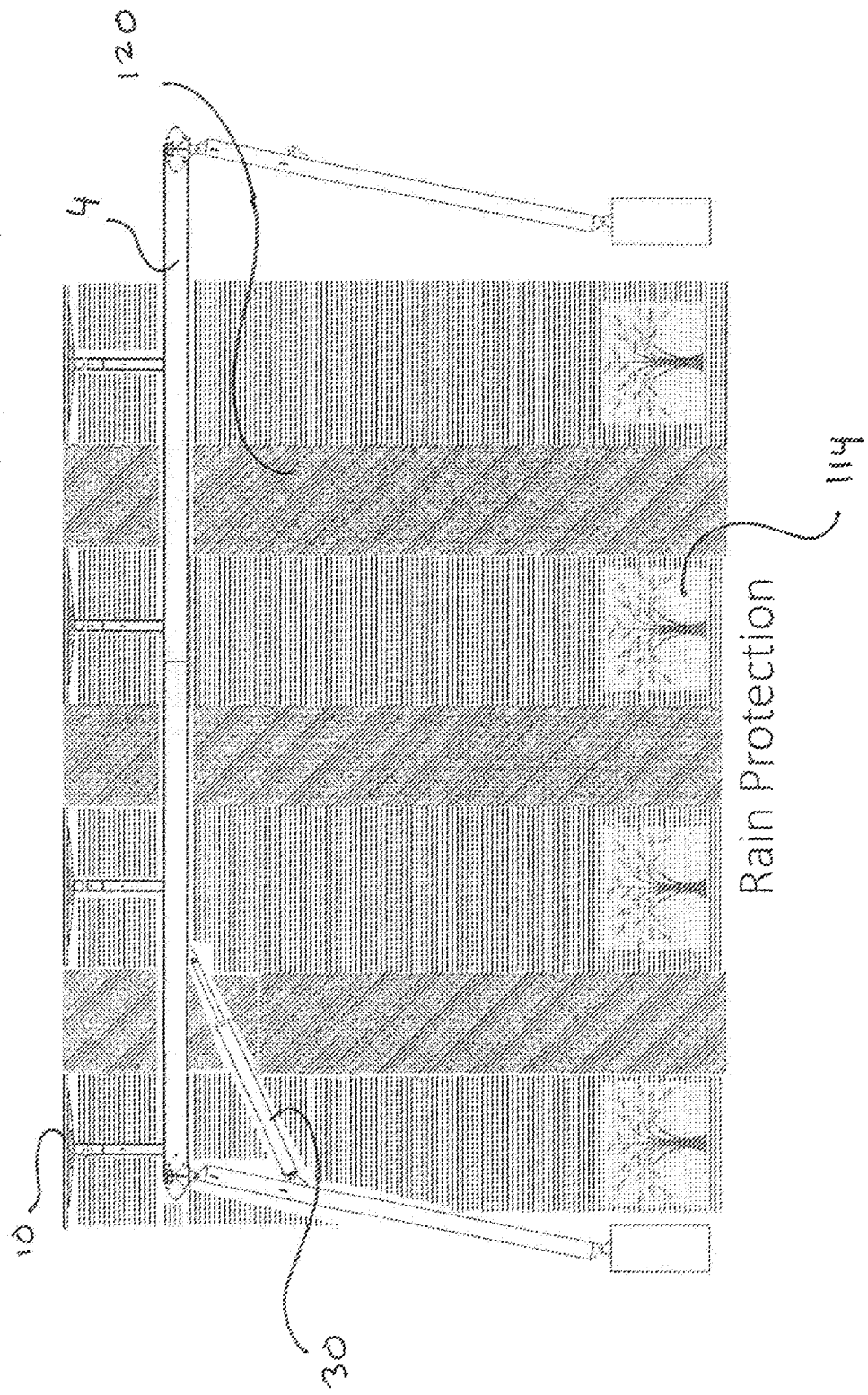

FIG. 14 shows the use of the linear actuators 30 to position the PV panels 10 to shield the row crops 114 from rain 120 damage. This is known as the "umbrella mode" and is particularly useful with delicate row crops such as grapes.

Figure 15:
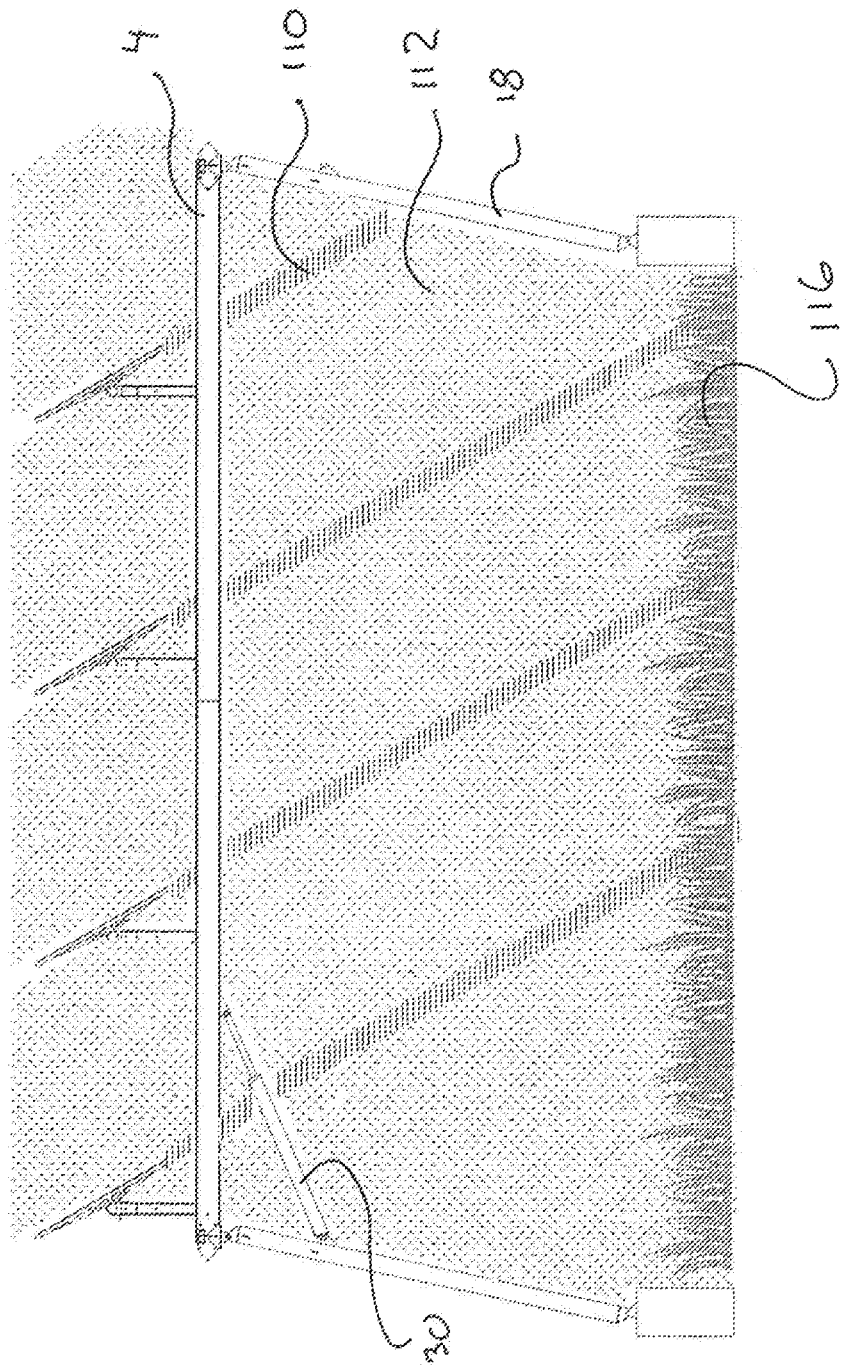
Figure 16:
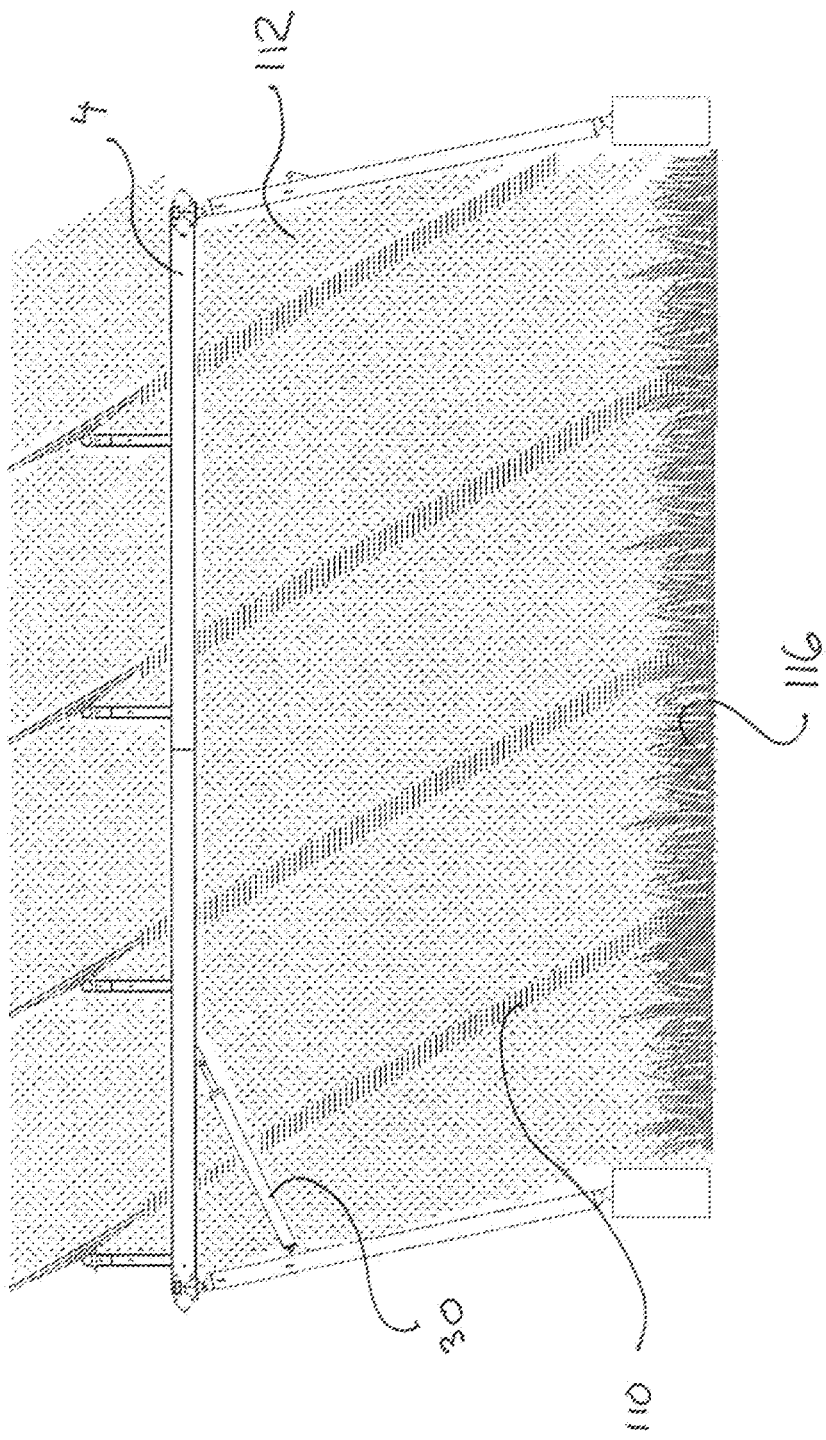

FIGS. 15 and 16 show an arrangement of minimum shading 110 and maximum sunlight 112 to the field crops 116 where the PV panels 10 have been tilted for maximum solar collection based on the position of the sun as determined by the counter tracking component of the algorithm in the data acquisition computer 100. It can be seen here where the linear actuators 30 have gradually moved the PV platform 4 between its furthermost shiftable positions to ensure even sunlight distribution across the field crops while the PV panels 10 remain in their most efficient position for solar collection.

It is to be noted that the prevailing wind is from the West in most locations so the system 2 will be parked at night or during storms in the furthermost West position with the solar panels placed at solar noon (horizontal) to provide the lowest aspect to collect wind loads.

The present invention advances the art of solar panel electricity generation and simultaneous crop production on agricultural lands or other disadvantaged or restricted lands, with minimal physical intrusion. The additional use of a West to East horizontally translating PV platform in conjunction with the Counter Tracking PV panels allows the creation of a microclimate underneath the panel array apparatus 2 that can be controlled and finely tuned for specific field or row crops in any climate by the algorithmically determined drive signals sent to the drive motors and the linear actuators by the data acquisition computer.

While certain features and aspects have been described with respect to exemplary embodiments, one skilled in the art will recognize that numerous modifications are possible. In the way of an example, the number of interior running spars may exceed one and the number of stiffening spars may exceed two as numerous segment interior geometric configurations may be utilized. Closer spacing of the interior running spars may eliminate the need for center spars and stiffening spars. The mass of the PV arrays supported and the overall size of the segment will dictate the number of additional interior supports that are needed. Various ground coverage ratios may be achieved by increasing or decreasing the spacing between PV panel rows. This could increase or decrease the number of rows of PV panels that are used in each Segment. It will be appreciated that the invention is intended to cover all modifications and equivalents within the scope of the following claims.

The PV panel arrays are built at a sufficient height above ground to allow conventional mechanized farming equipment (tractors, combines, harvesters) or robotic travelers to tend crops without interference. Robotic travelers that tend to and irrigate crops could significantly reduce the overall height of the PV panel arrays since conventional mechanized farming equipment would not be required. By controlling the horizontal positioning of the photovoltaic panel arrays for various intervals of time during the solar day, the sunlight can bypass the panels that are set in a Tracking or Counter Tracking mode so the wide surfaces of the rectangular panels are parallel to the sunlight flow thereby not blocking sunlight from the crops. Additionally, the spacing between panel rows is wide enough that sunlight also passes between PV panel rows to reach the crops whether the system is set for normal sidereal tracking or Counter Tracking. In the normal tracking mode, the power production is optimized by having each PV panel track the sun's movement, so the wide surfaces of each panel are perpendicular to the sunlight flow.

This method of tracking and Counter Tracking is based on extensive research to optimize power generation coordinated with successful crop growth. The percentages of Tracking/Counter Tracking are varied based on the species crop that is growing beneath the PV arrays, the location, the time of day, the time of year (growing season) and the local sunlight intensity. The local sunlight intensity in a specific spectral range is measured by meters located strategically below the axis of rotation of the panels (preferably below the segment platform of the photovoltaic panel array's support structure). This provides data to the data acquisition computer 100 of the amount of "growing" sun reaching the crops below the array. Local, direct and predicted wind conditions are also provided to the computer 100 via sensors and the internet. The computer's Counter Tracking program, with this data, performs an algorithm based on a species of crop and location specific program (computer application) to adjust a tracking command profile for the movement of the panels in the PV array to optimize Sun Sharing.

An equally important facet of the operation of this device is Sun Shading. Sun Shading is used in areas of very intense sunlight (such as desert regions) where unprotected crops are often damaged by the intense solar radiation. This occurs especially during the summer, which would otherwise be the prime growing season. For example, alfalfa which is grown in the Imperial Valley of California (Mojave Desert) typically grows and is harvested during January through September. The first of seven monthly cuts occurs in February or March. The first two monthly cuttings often have Total Digestible Nutrients (TDN) that make these cuttings certifiable for TDN, but the five cuts later in April through August are so sun damaged that they cannot be used as high TDN foodstuffs. Some are used as low-quality animal feeds and the last few cuts are used for silage. Operation of this device allows the crops to be Sun Shaded by the PV arrays. This results in many more high-TDN cuttings during each growing season. Sun Shading is accomplished by using normal sidereal tracking which shades and protects the crop(s) growing beneath the arrays from the deleterious effects of the hot, desert sunlight. Sun Shading has the additional advantage that the PV arrays produce a much higher percentage of their design power output because they are in constant tracking mode with very little Counter Tracking.

Many crops that are subject to "sunburn" can benefit from being grown in the environment provided by this device. Crops such as: peppers, tomatoes, lettuce, pumpkins, squash, cucumbers, walnuts, almonds all grow without negative sunburn impacts that often lead to significant crop loss or reductions in the quality and commercial viability of the crops.

Growing crops beneath PV arrays, has the additional advantage of reduced evapotranspiration. This means reduced water usage per unit volume of crop produced. Published studies show reduction in water usage in the 14% to 29% range for crops that are grown The Tracking/Counter-Tracking program's algorithms will also take into consideration the percentage of optimized PV panels to standard PV panels in the array for determination of the actual photosynthetically active radiation reaching the crops beneath.

The counter tracking for each PV panel array 4 is optimized for its location and the crop associated under it. The amount of light or shade (exposure time and intensity) the crops receive and when this occurs throughout the day, the solar year and the crop cycle, for the optimized growth of different types of crops across a growing season is determined by agricultural scientists. This is input to the discrete algorithm of the tracking/counter tracking program to be used for that crop at that location. The input from any of the environmental sensors along with the sun's position is algorithmically analyzed by the discrete counter tracking program to determine and generate the signal to the drive motors to tilt the PV panels. Counter-Tracking leads to controllable growing conditions that can vary the productivity of the crops, control when some crops flower and bud, etc. There are also overriding dangerous environmental conditions such as high wind loads that will cause the counter tracking program to rotate the PV panels to a horizontal position.

Solar/Agricultural research has demonstrated that certain crops that can otherwise be damaged by intense, direct sunlight actually grow with higher quality, better yields, and they produce higher levels of total digestible nutrients when the crops can be "shielded" from the all-day high intensity sunlight, especially during the summer growing season, through the use of Counter-Tracking. Counter-Tracking allows the farmer and power producer to cooperatively determine and create the optimal sun sharing and/or sun shading conditions for each crop by varying the Counter-Tracking program's algorithms that control the sun sharing/sun shading percentages for that crop. During experimental testing, reduction in evapotranspiration has been observed to create water savings of 14% to 29% using the disclosed techniques. This technology is particularly useful in areas with extremely high temperatures and/or with limited water access.

The additional advantage of an infinitely variable tracking/Counter-Tracking methodology to provide sun sharing between crop growth and power generation; is the additional ability to switch to 100% normal tracking when agricultural fields are fallow (between crop plantings). This maximizes the power generation on farmland when crops are not present.

The novel aspects of the method of producing solar power while allowing sufficient sunlight to pass by and/or through motorized tiltable PV arrays mounted on a horizontally translatable platform to the crops growing beneath the PV arrays can be seen in the steps of the preferred method below.

1. Install an array of PV panels mounted on rotatable torque tubes that are connected to drive motors for tiltable positioning, said torque tubes mounted on a platform that is horizontally translatable (shiftable) in an East-West axis by at least one linear actuator connected between said platform and an array column supporting said platform, said platform positioned over a crop field, at a minimum height of eight feet.

2. Install at least one sunlight intensity meter below an axis of rotation of said PV panels that provides sunlight intensity data signals to a connected computer.

3. Install at least one localized wind strength meter that provides wind strength data signals to the connected computer.

4. Operatively connect an internet with a site providing predicted weather data to the computer.

5. Operatively connect a tactile input device to the computer to provide user input instructions.

6. Provide solar positional data to the computer.

7. Operably connect the computer to the drive motors and the linear actuators, where the computer performs a crop specific algorithmic calculation using: sunlight intensity data from the sunlight intensity meters, wind strength data from the wind strength meters, predicted weather data from the internet; sidereal tracking solar position data and user input instructions, to operate the drive motors to tilt the PV Panels and to operate the linear actuators to translate the platform to optimize both electrical power generation and crop growth.

Although optimally the platform of the support structure will be approximately 15-18 feet off of the ground, it need be only high enough to allow the type of mechanized equipment used on the underlying crops to safely work, which sets the minimal height of 8 feet. Also, optimally the solar positional data provided to the computer will be sidereal tracking solar position data, although solar tracking data determined through other tracking systems may be substituted.

Many other embodiments are possible depending upon, but limited to the following parameters: land latitude, weather (e.g. sunny, cloudy, rain); type of crop; growing season; soil quality and drainage; irrigation systems and levels; stage of crop growth; and scheduled or unscheduled agricultural work such as plowing, seeding, fertilizing, pest control, weed control & harvesting.

The basic method need not use computers or motors and may have as few steps as follows:

1. Installing a shiftable and East to West horizontally translatable array of PV panels over a crop field, on a structure having a platform raised a minimum of eight feet above the ground; said PV panels selected from the group of PV panels consisting of PV panels that are standard of the industry, or partially transparent, PV panels that are translucent or PV panels that are slotted;

2. Determining an optimizing balance of sunlight intensity on said PV panel array and on said crops beneath said PV panel array to produce solar power and crop growth;

3. Tilting said dynamically shifting the PV panel array to a horizontal position of determined position and for a determined period of time to adjust and maintain the sunlight intensity on said PV panel array and on said crops while simultaneously translating the PV panels to meet said optimizing balance of said sunlight intensity.

The present invention advances the art of electricity generation using standard PV panels and/or optimized PV panels that permit sunlight to pass through or around them or by a combination of both types of panels. This allows utilizing already existing agricultural lands, while coexisting with minimal interference with the agricultural uses of the land. Research has demonstrated that certain crops that can otherwise be damaged by intense, direct sunlight actually grow with higher quality, better yields, and they produce higher levels of Total Digestible Nutrients when the crops can be "shielded" from the all-day high intensity sunlight, especially during the summer growing season, through the use of Counter-Tracking and Dynamic Shifting of the array.. Counter-Tracking allows the farmer and power producer to cooperatively determine and create the optimal Sun Sharing conditions for each crop by varying the Counter-Tracking algorithms that control the Sun Sharing percentages for that crop. During experimental testing, reduction in evapotranspiration has been observed to create water savings of 14% to 29% using these Sun Sharing techniques. This technology is particularly useful in areas with extremely high intensity sunlight such as deserts, that would otherwise preclude farming operations.

Since each tracking/ counter tracking program is a specialized program taking into consideration the geographic location and crop(s) being grown beneath the array, to provide Sun Sharing between crop growth and power generation; there is the additional ability to switch to 100% normal tracking when agricultural fields are fallow (between crop plantings). This maximizes the power generation on farmland when crops are not present.

The most novel aspect of this hinge-up embodiment is not the method of erection, but rather the pivot assemblies 16 at the bottom and top of each array column 18 that enable the PV platform 4 to Dynamically Shift East-West during the solar day. This shifting moves the shadow that is created on the ground by the PV panels 10 and allows us to expand Sun Sharing and Sun Shading as required. This east-west lateral movement can be done independent of tracking/Counter-Tracking or in combination with it.

While certain features and aspects have been described with respect to exemplary embodiments, one skilled in the art will recognize that numerous modifications are possible. In the way of an example, the number of interior running spars may exceed one and the number of stiffening spars may exceed two or be reduced to one as numerous segment interior geometric configurations may be utilized. The mass of the PV arrays supported and the overall size of each Segment will dictate the number of additional interior supports that are needed. In a further example, the support structure may be held in its configuration raised above an agricultural field by as few a one piling centrally located. It will be appreciated that the invention is intended to cover all modifications and equivalents within the scope of the following claims.

Having thus described the invention, what is claimed as new and desired to be secured by Letters Patent is as follows:

1. A dynamically shifting photovoltaic panel array apparatus, comprising:

at least one planar platform horizontally translatable between an East and West direction;

an array of tiltable photovoltaic panels mounted onto a top of said platform;

at least four foundation piers;

at least four vertical tiltable array columns having a lower end and an upper end, each said lower end pivotally mounted to one of said at least four foundation piers by a lower pivot assembly, and each said upper end pivotally mounted to said platform by an upper pivot assembly;

at least two extendible linear actuators, each having a first end and a second end, each said first end directly connected to said platform and each said second end directly connected to one of said tiltable array columns, and wherein each of said at least two extendible linear actuators is disposed at an acute angle between said platform and one of said at least four tiltable array columns that exceeds zero degrees, so as to enable the horizontal translation of said array of tiltable photovoltaic panels.

2. The dynamically shifting photovoltaic panel array apparatus of claim 1, further comprising:

at least one torque tube onto which at least some of said array of photovoltaic panels are mounted;

at least one drive motor rotatably connected to said torque tube for the tilting of said at least some of said array of photovoltaic panels.

3. The dynamically shifting photovoltaic panel array apparatus of claim 1, wherein said extendible linear actuators are selected from the group consisting of electric screw jacks, hydraulic jacks or pneumatic jacks with angle limiting stop mechanisms thereon to keep said platform within a preset limit of horizontal travel.

4. The dynamically shifting photovoltaic panel array apparatus of claim 2, wherein said extendible linear actuators are selected from the group consisting of electric screw jacks, hydraulic jacks or pneumatic jacks with angle limiting stop mechanisms thereon to keep said platform within preset limits of horizontal travel.

5. The dynamically shifting photovoltaic panel array apparatus of claim 1, wherein each of said upper pivot assemblies is made of a first coupling half affixed to a distal end of a respective one of said array columns and pivotally connected with a pivot axle to a second coupling half affixed to said platform, and wherein each of said lower pivot assemblies is made of a first coupling half affixed to a proximal end of a respective one of said array columns and pivotally connected with a pivot axle to a second coupling half affixed to a respective one of said foundation piers.

6. The dynamically shifting photovoltaic panel array apparatus of claim 5 wherein each said first coupling half is a plate with a first orifice therethrough, and each said second coupling half is a base plate with a pair of parallel plates with a pair of aligned second orifices therethrough extending normally therefrom, wherein said pair of parallel plates are spaced apart to receive said plate.

7. The dynamically shifting photovoltaic panel array apparatus of claim 4, further comprising:

a data acquisition computer in communication with said at least one drive motor communication with said electric screw jacks or hydraulic jacks or pneumatic jacks;

a first drive signal sent from said data acquisition computer to said at lease one drive motor to rotate said torque tube and tilt at least some of said array of photovoltaic panels; and a second drive signal sent from said data acquisition computer to said electric screw jacks or hydraulic jacks or pneumatic jacks to extend or retract said jacks and shift said platform in the East or West direction.

8. The dynamically shifting photovoltaic panel array apparatus of claim 7, wherein said first drive signal and said second drive signal are simultaneous signals.

9. The dynamically shifting photovoltaic panel array apparatus of claim 1, further comprising:

a platform East travel limit no less than one half of a photovoltaic panel length; and a platform West travel limit no less than one half of said photovoltaic panel length.

10. The dynamically shifting photovoltaic panel array apparatus of claim 1, further comprising:

at least four linear actuator mounts, said mounts pivotally affixed between a proximal end of said at least two linear actuators and two of said at least four array columns, and pivotally affixed between a distal end of said at least two linear actuators and said platform.

* * * * *